(12) United States Patent
Ozgul et al.

(10) Patent No.: US 12,067,406 B2
(45) Date of Patent: Aug. 20, 2024

(54) MULTIPLE OVERLAYS FOR USE WITH A DATA PROCESSING ARRAY

(71) Applicant: Xilinx, Inc., San Jose, CA (US)

(72) Inventors: Baris Ozgul, Stoney Road (IE); David Clarke, Dublin (IE); Peter McColgan, North Dublin (IE); Stephan Münz, Dublin (IE); Dylan Stuart, Kildare (IE); Pedro Miguel Parola Duarte, Dublin (IE); Juan J. Noguera Serra, San Jose, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/819,879

(22) Filed: Aug. 15, 2022

(65) Prior Publication Data

US 2023/0053537 A1 Feb. 23, 2023

Related U.S. Application Data

(60) Provisional application No. 63/235,319, filed on Aug. 20, 2021, provisional application No. 63/235,532, filed on Aug. 20, 2021.

(51) Int. Cl.
*G06F 9/445* (2018.01)
*G06F 9/50* (2006.01)
(Continued)

(52) U.S. Cl.
CPC ........ *G06F 9/44505* (2013.01); *G06F 9/5083* (2013.01); *G06F 13/1673* (2013.01);
(Continued)

(58) Field of Classification Search
None
See application file for complete search history.

(56) References Cited

U.S. PATENT DOCUMENTS

| 3,776,137 A | 12/1973 | Abbott |
| 4,876,641 A | 10/1989 | Cowley |

(Continued)

FOREIGN PATENT DOCUMENTS

| WO | 2019195132 | 10/2019 |
| WO | 2019195309 | 10/2019 |

(Continued)

OTHER PUBLICATIONS

Xilinx, Inc., "Xilinx AI Engines and Their Applications," WP506 (v1.1) Jul. 10, 2020, 13 pages.

(Continued)

*Primary Examiner* — Farley Abad
*Assistant Examiner* — Dayton Lewis-Taylor
(74) *Attorney, Agent, or Firm* — Kevin T. Cuenot

(57) ABSTRACT

Using multiple overlays with a data processing array includes loading an application in a data processing array. The data processing array includes a plurality of compute tiles each having a processor. The application specifies kernels executable by the processors and implements stream channels that convey data to the plurality of compute tiles. During runtime of the application, a plurality of overlays are sequentially implemented in the data processing array. Each overlay implements a different mode of data movement in the data processing array via the stream channels. For each overlay implemented, a workload is performed by moving data to the plurality of compute tiles based on the respective mode of data movement.

20 Claims, 20 Drawing Sheets

(51) Int. Cl.
*G06F 13/16* (2006.01)
*G06F 13/28* (2006.01)
*G06F 17/16* (2006.01)
*G06N 3/063* (2023.01)

(52) U.S. Cl.
CPC .............. *G06F 13/28* (2013.01); *G06F 17/16* (2013.01); *G06N 3/063* (2013.01)

(56) References Cited

U.S. PATENT DOCUMENTS

| | | | |
|---|---|---|---|
| 6,091,263 A | 7/2000 | New et al. | |
| 6,150,839 A | 11/2000 | New et al. | |
| 6,204,687 B1 | 3/2001 | Schultz et al. | |
| 6,462,579 B1 | 10/2002 | Camilleri et al. | |
| 6,526,557 B1 | 2/2003 | Young et al. | |
| 6,759,869 B1 | 7/2004 | Young et al. | |
| 6,781,407 B2 | 8/2004 | Schultz | |
| 6,810,514 B1 | 10/2004 | Alfke et al. | |
| 6,836,842 B1 | 12/2004 | Guccione et al. | |
| 6,907,595 B2 | 6/2005 | Curd et al. | |
| 7,024,651 B1 | 4/2006 | Camilleri et al. | |
| 7,057,413 B1 | 6/2006 | Young et al. | |
| 7,124,338 B1 | 10/2006 | Mark et al. | |
| 7,185,309 B1 | 2/2007 | Kulkarni et al. | |
| 7,199,608 B1 | 4/2007 | Trimberger | |
| 7,224,184 B1 | 5/2007 | Levi et al. | |
| 7,281,093 B1 | 10/2007 | Kulkarni et al. | |
| 7,301,822 B1 | 11/2007 | Walstrum, Jr. et al. | |
| 7,302,625 B1 | 11/2007 | Payakapan et al. | |
| 7,454,658 B1 | 1/2008 | Baxter | |
| 7,328,335 B1 | 2/2008 | Sundararajan et al. | |
| 7,380,035 B1 | 5/2008 | Donlin | |
| 7,394,288 B1 | 7/2008 | Agarwal | |
| 7,420,392 B2 | 9/2008 | Schultz et al. | |
| 7,477,072 B1 | 1/2009 | Kao et al. | |
| 7,478,357 B1 | 1/2009 | Mason et al. | |
| 7,482,836 B2 | 1/2009 | Levi et al. | |
| 7,500,060 B1 | 3/2009 | Anderson et al. | |
| 7,509,617 B1 | 3/2009 | Young | |
| 7,518,396 B1 | 4/2009 | Kondapalli et al. | |
| 7,521,961 B1 | 4/2009 | Anderson | |
| 7,539,845 B1 | 5/2009 | Wentzlaff et al. | |
| 7,546,572 B1 | 6/2009 | Ballagh et al. | |
| 7,574,680 B1 | 8/2009 | Kulkarni et al. | |
| 7,576,561 B1 | 8/2009 | Huang | |
| 7,619,442 B1 | 11/2009 | Mason et al. | |
| 7,640,527 B1 | 12/2009 | Dorairaj et al. | |
| 7,650,248 B1 | 1/2010 | Baxter | |
| 7,653,820 B1 | 1/2010 | Trimberger | |
| 7,689,726 B1 | 3/2010 | Sundararajan et al. | |
| 7,724,815 B1 | 5/2010 | Raha et al. | |
| 7,746,099 B1 | 6/2010 | Chan et al. | |
| 7,774,579 B1 | 8/2010 | Wentzlaff | |
| 7,788,625 B1 | 8/2010 | Donlin et al. | |
| 7,831,801 B1 | 11/2010 | Anderson | |
| 8,006,021 B1 | 8/2011 | Li et al. | |
| 8,020,163 B2 | 9/2011 | Nollet et al. | |
| 8,045,546 B1 | 10/2011 | Bao et al. | |
| 8,102,188 B1 | 1/2012 | Chan et al. | |
| 8,214,694 B1 | 7/2012 | McKechnie et al. | |
| 8,250,342 B1 | 8/2012 | Kostamov et al. | |
| 8,359,448 B1 | 1/2013 | Neuendorffer | |
| 8,415,974 B1 | 4/2013 | Lysaght | |
| 8,656,141 B1 | 2/2014 | Agarwal | |
| 8,719,750 B1 | 5/2014 | Balzli, Jr. | |
| 8,796,539 B2 | 8/2014 | Asaumi et al. | |
| 8,928,351 B1 | 1/2015 | Konduru | |
| 9,081,634 B1 | 7/2015 | Simkins et al. | |
| 9,152,794 B1 | 10/2015 | Sanders et al. | |
| 9,165,143 B1 | 10/2015 | Sanders et al. | |
| 9,218,443 B1 | 12/2015 | Styles et al. | |
| 9,230,112 B1 | 1/2016 | Peterson et al. | |
| 9,323,876 B1 | 4/2016 | Lysaght et al. | |
| 9,336,010 B2 | 5/2016 | Kochar et al. | |
| 9,411,688 B1 | 8/2016 | Poolla et al. | |
| 9,436,785 B1 | 9/2016 | Javre | |
| 9,639,487 B1 | 5/2017 | Wentzlaff | |
| 9,652,252 B1 | 5/2017 | Kochar et al. | |
| 9,652,410 B1 | 5/2017 | Schelle et al. | |
| 9,722,613 B1 | 8/2017 | Schultz et al. | |
| 9,990,241 B2 | 6/2018 | Dobbs | |
| 10,243,882 B1 | 3/2019 | Swarbrick | |
| 10,505,548 B1 | 12/2019 | Swarbrick | |
| 10,673,439 B1 | 6/2020 | Ahmad | |
| 10,673,745 B2 | 6/2020 | Swarbrick | |
| 10,747,690 B2 | 8/2020 | Bilski | |
| 10,824,505 B1 | 11/2020 | Swarbrick | |
| 10,824,584 B1 | 11/2020 | Noguera Serra | |
| 10,838,908 B2 | 11/2020 | Swarbrick | |
| 10,866,753 B2 | 12/2020 | Noguera Serra et al. | |
| 10,963,421 B1 | 3/2021 | Swarbrick | |
| 2004/0114609 A1 | 6/2004 | Swarbrick et al. | |
| 2004/0210695 A1 | 10/2004 | Weber et al. | |
| 2007/0006137 A1 | 1/2007 | Savagaonkar | |
| 2007/0124565 A1 | 5/2007 | Jones | |
| 2008/0082759 A1 | 4/2008 | Pong | |
| 2008/0320255 A1 | 12/2008 | Wingard et al. | |
| 2008/0320268 A1 | 12/2008 | Wingard et al. | |
| 2012/0036296 A1 | 2/2012 | Wingard et al. | |
| 2012/0310983 A1 | 12/2012 | Mittal | |
| 2014/0006751 A1 | 1/2014 | Aliseychik et al. | |
| 2014/0267334 A1 | 9/2014 | Duluk, Jr. | |
| 2016/0011996 A1 | 1/2016 | Asaad et al. | |
| 2017/0140800 A1 | 5/2017 | Wingard et al. | |
| 2017/0220499 A1 | 8/2017 | Gray | |
| 2017/0315944 A1 | 11/2017 | Mayer et al. | |
| 2018/0012637 A1 | 1/2018 | Krishna | |
| 2018/0315158 A1* | 11/2018 | Nurvitadhi | G06N 3/084 |
| 2019/0042923 A1 | 2/2019 | Janedula et al. | |
| 2019/0155666 A1 | 5/2019 | Dobbs | |
| 2019/0205263 A1 | 7/2019 | Fleming | |
| 2019/0205269 A1 | 7/2019 | Fleming, Jr. | |
| 2019/0238453 A1 | 8/2019 | Swarbrick et al. | |
| 2019/0266125 A1 | 8/2019 | Swarbrick et al. | |
| 2019/0303033 A1 | 10/2019 | Noguera Serra et al. | |
| 2019/0303311 A1 | 10/2019 | Bilski et al. | |
| 2019/0303323 A1 | 10/2019 | Swarbrick et al. | |
| 2019/0303328 A1 | 10/2019 | Bilski et al. | |
| 2022/0075842 A1* | 3/2022 | Bhaskaracharya | G06F 17/16 |

FOREIGN PATENT DOCUMENTS

| | | |
|---|---|---|
| WO | 2019195343 | 10/2019 |
| WO | 2021/133499 A1 | 7/2021 |

OTHER PUBLICATIONS

Xilinx, Inc., "Versal: The First Adaptive Compute Acceleration Platform (ACAP)," WP505 (v1.1.1) Sep. 29, 2020, 21 pages.

* cited by examiner

1100

| Overlay | Mode | Cascade | IFM Streams | W Streams |
|---------|------|---------|-------------|-----------|
| 0 | 0 | No | 4 | 2 |
| 1 | 1 | No | 2 | 4 |
| 2 | 2 | Yes | 4 | 4 |

FIG. 11

Overlay 0, Mode 0

MULTIPLE OVERLAYS FOR USE WITH A DATA PROCESSING ARRAY

CROSS-REFERENCE TO RELATED APPLICATIONS

This application claims the benefit of U.S. Provisional Patent Application No. 63/235,319 filed on Aug. 20, 2021, and to U.S. Provisional Patent Application No. 63/235,532 filed on Aug. 20, 2021, both of which are incorporated by reference herein in their entirety.

TECHNICAL FIELD

This disclosure relates to integrated circuits (ICs) and, more particularly, to using multiple overlays with a data processing array implemented within an IC. This disclosure also relates to controlling operation of a data processing array using one or more array controllers.

BACKGROUND

Integrated circuits (ICs) have evolved over time to provide increasingly sophisticated computing architectures. While some ICs utilize computing architectures that include a single processor, others include multiple processors. Still, other ICs include multiple processors arranged in an array. Such ICs are capable of providing significant computational power and a high degree of parallelism that extends well beyond the capabilities of single-processor architectures and even multi-core processor architectures.

SUMMARY

In one or more example implementations, a method includes loading an application in a data processing array. The data processing array includes a plurality of compute tiles each having a processor. The application specifies kernels executable by the processors and implements stream channels that convey data to the plurality of compute tiles. The method includes, during runtime of the application, sequentially implementing a plurality of overlays in the data processing array. Each overlay implements a different mode of data movement in the data processing array via the stream channels. The method includes, for each overlay implemented, performing a workload by moving data to the plurality of compute tiles based on the respective mode of data movement.

In one or more example implementations, a system includes a data processing array disposed in an integrated circuit. The data processing array includes a plurality of compute tiles each having a processor. The data processing array is configured to implement an application. The application specifies kernels executable by the processors and stream channels that convey data to the plurality of compute tiles. During runtime of the application, the data processing array is adapted to implement a plurality of different overlays. Each overlay implements a different mode of data movement in the data processing array via the stream channels to perform a workload.

In one or more example implementations, an integrated circuit includes a data processing array including a plurality of compute tiles each having a processor. The integrated circuit includes an array controller coupled to the data processing array. The array controller is adapted to configure the plurality of compute tiles of the data processing array to implement an application. The application specifies kernels executable by the processors and stream channels that convey data to the plurality of compute tiles. The array controller is configured to initiate execution of workloads by the data processing array as configured with the application.

In one or more example implementations, an integrated circuit includes a data processing array. The data processing array includes a plurality of compute tiles each having a processor. The data processing array is subdivided into a first partition including a first subset of the plurality of compute tiles and a second partition including a second subset of the plurality of compute tiles. The integrated circuit includes a first array controller adapted to configure the first partition to implement a first application. The first application specifies kernels executable by the processors of the first partition and stream channels that convey data to the first subset of the plurality of compute tiles of the first partition. The integrated circuit includes a second array controller adapted to configure the second partition to implement a second application. The second application specifies kernels executable by the processors of the second partition and stream channels that convey data to the second subset of the plurality of compute tiles of the second partition. The first array controller and the second array controller each is configured to initiate execution of workloads in the respective partitions.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 11 is a table illustrating attributes of example overlays used to configure an application for a partition of a DP array.

DETAILED DESCRIPTION

Figure 1:
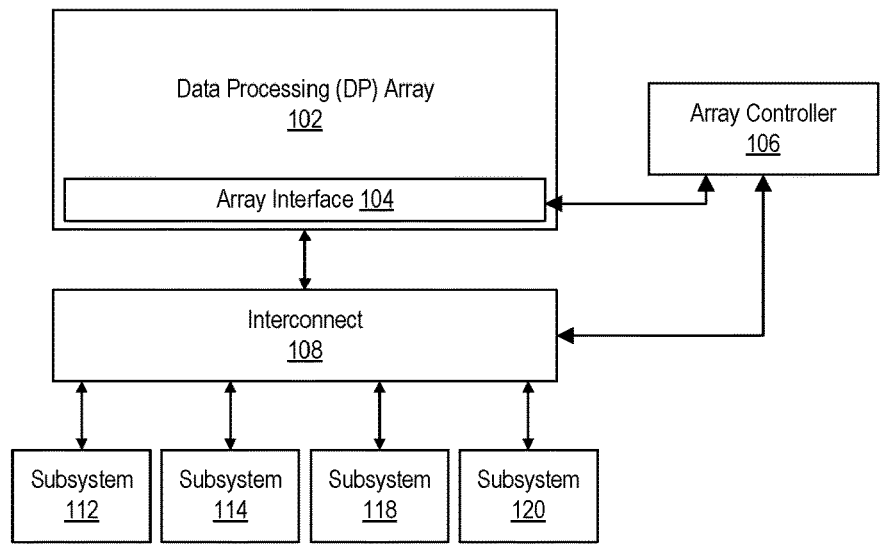
FIG. 1 illustrates an example system including a data processing (DP) array.

This disclosure relates to integrated circuits (ICs) and to using multiple overlays with a data processing (DP) array implemented within an IC. This disclosure also relates to controlling operation of a DP array using one or more array controllers.

A DP array includes a plurality of circuit blocks referred to as tiles. The tiles may include compute tiles and interface tiles and/or a mix of compute tiles, interface tiles, and memory tiles. The DP array is configurable to perform desired computational activities by loading configuration data, referred to as an "application," into the DP array. Once configured with an application, the DP array is able to perform computational activities.

In one aspect, the application loaded into the DP array specifies a plurality of kernels that are executable by the compute tiles. For example, the application may specify particular kernels that are to be executed by particular ones of the compute tiles, e.g., a mapping of kernels to compute tiles. The application may also specify configuration data that implements a plurality of stream channels that communicatively link the tiles of the DP array.

Having implemented an application in the DP array, different overlays may be implemented in the DP array to execute the application. Each overlay that is implemented specifies a mode of data movement within the DP array. That is, each overlay specifies a mode of data movement among tiles of the DP array. For example, each overlay specifies the particular data items that are to be provided to the respective compute tiles via the stream channels implemented by the application. The data items may include feature maps and/or weights.

In one aspect, the application is a multi-layered application. Different layers of the application may be implemented by loading a different overlay in the DP array. For each overlay implemented in the DP array, one or more runtime parameters may be provided to the tiles of the DP array to further adapt the overlay to the particular layer of the application implemented by the overlay. The DP array, as configured with the application, an overlay, and one or more runtime parameters, is capable of performing a workload for a layer of the application. In general, the term "workload" refers to performing the operations necessary to process the input data for a particular layer of a multi-layered application.

Unlike static or fixed circuit architectures, the configurability of the DP array allows the DP array to adapt to different workloads (e.g., layers) over time. The DP array is adapted to the different layers without having to reconfigure the DP array by loading a different application therein. For purposes of illustration, consider an example where the DP array is used to perform one or more matrix multiply operations. Matrix multiply operations are utilized in many different computational contexts including, but not limited to, machine learning, image processing, computer vision, virtual and/or extended reality, and genetic analysis. In the case of machine learning, for example, different layers of a neural network may perform different matrix multiply operations where the matrices operated on in the different layers have differing dimensions. When using a fixed or static circuit architecture to implement these different layers, that circuit architecture may perform matrix multiply operations of certain layers efficiently, but matrix multiply operations of other, different layers of different dimensions less efficiently. This holds true for other types of workloads that do not involve matrix multiply operations.

In accordance with the inventive arrangements described within this disclosure, a DP array may be adapted over time to perform a variety of different workloads efficiently. The DP array may be configured to execute a particular application. Different overlays may be loaded over time to implement different layers of the application at runtime. Each overlay may implement a particular mode of data movement in the DP array that is suited to implementing the particular layer of the application to which the overlay is mapped. Different runtime parameters for the overlays may be loaded as well, where the runtime parameters may be specific to each layer of the application.

Consider the prior matrix multiply example. The DP array may be loaded with an application that includes kernels adapted to perform matrix multiply operations. The application further specifies the stream channels implemented in the DP array. Different overlays and runtime parameters may be loaded into the DP array over time to adapt the DP array, as configured with the application, to efficiently perform different matrix multiply operations (e.g., differently dimensioned matrix multiplies) corresponding to different layers of the application. Certain operative features of each overlay and the kernels being executed by the compute tiles may be changed on a per-layer basis through the loading of the runtime parameters. In one aspect, the runtime parameters may specify the particular dimensions of the layer being implemented by a given overlay.

Loading an application may require a non-trivial number of clock cycles. By comparison, loading an overlay and the corresponding runtime parameters to implement a particular layer of the application consumes significantly less time (e.g., fewer clock cycles). By utilizing the application-overlay paradigm described herein, the DP array may be adapted to efficiently implement different layers of an application without having to continually reconfigure the DP array. That is, the DP array may be adapted from one layer to the next without having to load a different application for each layer of the application, which would cause the DP array to sit idle while being continually reconfigured thereby reducing computational efficiency and throughput.

In some cases, controlling the loading of applications, overlays, and runtime parameters, and initiating workloads for the DP array requires significant computational resources. These operations may consume a significant amount of clock cycles for a processor tasked with such responsibilities leaving few clock cycles available for the processor to perform other functions or execute other applications. Accordingly, in one or more example implementations, one or more array controller(s) may be included in the same IC as the DP array to harness the significant computational power provided by the DP array. The array controller(s) may be dedicated to controlling operation of the DP array.

Inclusion of the array controller(s) ensures smooth and efficient operation of the DP array. For example, since the array controller(s) are dedicated to managing the DP array and are not attempting to multitask with other non-DP array-related operations, the array controller(s) are able to keep the DP array busy to achieve higher data throughput. Inclusion of the array controller(s) also relieves other processors, whether disposed in the IC or external to the IC, from performing DP array-related control operations so that such processors may perform other tasks.

For IC architectures that include programmable logic, one or more of the array controllers may be implemented in programmable logic. In other examples, for IC architectures that include programmable logic, one or more array controllers may be implemented in programmable logic while one or more other array controllers may be implemented as hardwired circuit blocks. In still other examples, for IC architectures that do not include programmable logic, the array controller(s) may be implemented as hardwired circuit blocks. It should be appreciated that array controller(s) also may be implemented as hardwired circuit blocks in ICs that do include programmable logic. Further aspects of the inventive arrangements are described below with reference to the figures.

FIG. 1 illustrates an example system 100. In the example, system 100 includes a DP array 102, an array controller 106, an interconnect 108, and one or more subsystems 112, 114, 118, and/or 120. DP array 102 includes an array interface 104.

In one or more example implementations, system 100 is implemented as an integrated circuit (IC). System 100 may be implemented within a single IC package. In one aspect, system 100 is implemented using a single die disposed in a single IC package. In another aspect, system 100 is implemented using two or more interconnected dies disposed within a single IC package.

DP array 102 is formed of a plurality of circuit blocks referred to as tiles. The tiles may include compute tiles, memory tiles, and/or interface tiles. For purposes of discussion, the term "array tiles" is used herein to refer to compute tiles or a mixture of compute tiles and memory tiles. Compute tiles and memory tiles are hardwired and are programmable. Array interface 104 includes a plurality of circuit blocks referred to as "interface tiles." The interface tiles communicatively link array tiles of DP array 102 with circuits outside of DP array 102. Interface tiles are hardwired and programmable.

Array controller 106 is communicatively linked to DP array 102 and/or array interface 104. Array controller 106 may be coupled to DP array 102 and/or array interface 104 directly and/or via interconnect 108. In one aspect, array controller 106 is dedicated to configuring DP array 102 and controlling the operation of DP array 102. That is, array controller 106 performs only functions relating to configuration and/or control of DP array 102. Array controller 106 may be implemented as a state machine or as a processor capable of executing program code. In one example, array controller 106 is implemented as a hardwired circuit block. In another example, array controller 106 is implemented using programmable logic. In one or more example implementations, array controller 106 may be omitted. In that case, a processor that may be implemented as one of subsystems 112-120 may perform the operations attributed to array controller 106. In the alternative, a processor external to system 100 may perform the operations attributed to array controller 106.

Interconnect 108 is coupled to array interface 104, array controller 106, and one or more of subsystems 112-120. Interconnect 108 may be implemented as an on-chip interconnect. An example of an on-chip interconnect is an Advanced Microcontroller Bus Architecture (AMBA) eXtensible Interface (AXI) bus. An AXI bus is an embedded microcontroller bus interface for use in establishing on-chip connections between circuit blocks and/or systems. Other example implementations of interconnect 108 may include, but are not limited to, other buses, a crossbar, a Network-on-Chip (NoC), and so forth. For purposes of illustration, interconnect 108 may include, or be coupled to, a memory controller that is capable of reading and/or writing to one or more memories.

Subsystems 112-120 may represent any of a variety of different types of electronic subsystems and/or circuits. For purposes of illustration, examples of subsystems 112-120 may include, but are not limited to, any combination of a processor or processor system, programmable logic, hardwired circuit blocks (e.g., application-specific circuit blocks), memories, and the like. It should be appreciated that the number of subsystems illustrated in the example of FIG. 1 is for purposes of illustration. System 100 may include more or fewer subsystems than shown. Some example implementations of system 100 may include only DP array 102 or only DP array 102 and one or more array controllers 106, for example.

A processor that is implemented as one of subsystems 112-120 is capable of executing computer-readable instructions. In an example, the processor is implemented as a hardwired processor. In another example, the processor is implemented as a soft-processor using programmable logic. In some cases where a processor is implemented as one of subsystems 112-120, array controller 106 may be omitted. In that case, the processor may be programmed to configure DP array 102 and control the operation of DP array 102.

In another aspect, a processor may be external to the IC including DP array 102. In that case, the processor may be part of another data processing system (e.g., a host computer) that is communicatively linked to the IC including DP array 102. In cases where a processor is included as part of a host computer, the processor may communicate with array controller 106 to control operation of array controller 106. In one aspect, the processor may write runtime data that is executed by array controller 106 to control operation of DP array 102. In example implementations in which array controller 106 is omitted, the particular processor used to control operation of DP array 102, whether external or implemented within one of subsystems 112-120, may or may not be dedicated for controlling DP array 102.

In an example, one or more of subsystems 112-120 may be implemented as a memory. The memory may be implemented as a random-access memory (RAM). In one example, the memory may be implemented as a High Bandwidth Memory (HBM). The memory, for example, may be a RAM circuit (e.g., an HBM) implemented on the same die as DP array 102 or on a different die within the same IC package. In another aspect, one or more memories may be implemented external to the IC including DP array 102.

In one or more example implementations, certain elements of system 100 such as array controller 106, interconnect 108, and one or more or all of subsystems 112-120 are optional and may be omitted.

Figure 2:
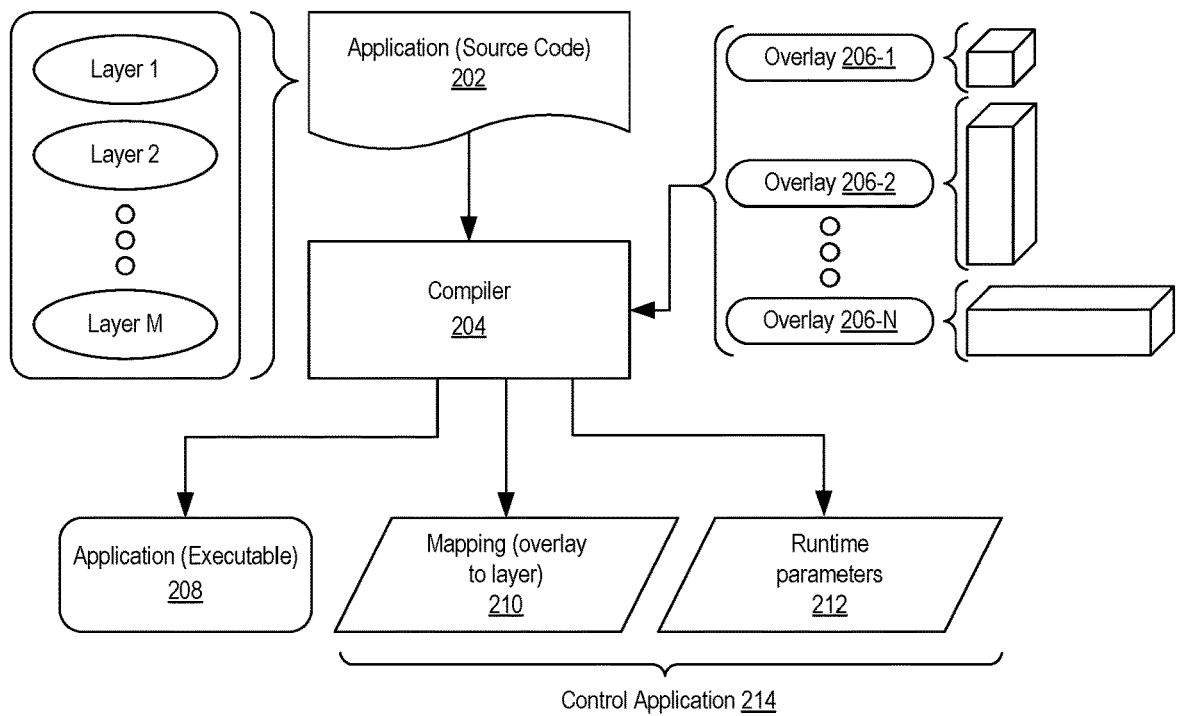
FIG. 2 illustrates an example of an implementation flow for generating an application for a DP array.

FIG. 2 illustrates an example of an implementation flow 200 for generating an application for a DP array. The implementation flow 200 of FIG. 2 may be performed or implemented by a data processing system. An example of a data processing system that is capable of performing implementation flow 200 is described in connection with FIG. 19.

In the example of FIG. 2, application 202 may be provided to a compiler 204. Application 202 may be specified in source code. In one or more examples, application 202 is specified in a high-level programming language such as C and/or C++. In one or more examples, application 202 may be specified as a data flow graph that specifies one or more kernels that are to be compiled and executed by compute tiles of DP array 102.

In general, compiler 204 is capable of generating an executable version of an application that may be executed by DP array 102 (e.g., the compute tiles included therein). Compiler 204 is also capable of generating a control application that is executable by array controller 106 or other processor for controlling operation of DP array 102. In executing the control application, array controller 106 is capable of loading an application, overlays for the application, and runtime parameters for layers of the application. Array controller 106, in executing the control application, is also capable of initiating workloads in the DP array 102 as configured with an application, overlay, and runtime parameters.

In one or more example implementations, application 202 is a multi-layered application. In one example, application 202 is implemented as a neural network. In another example, application 202 may be implemented as a machine learning model. Examples of different types of machine learning models that may be implemented by application 202 may include, but are not limited to, a Convolutional Neural Network (CNN), a Long-Short Term Memory (LSTM) Network, a Deep Learning Recommendation Model (DLRM), or the like.

In one aspect, each different type of machine learning model may be specified as a different application, where the application is built using kernels that are specific to the machine learning model being implemented. Kernels refer to executable program code that may be executed by the compute tiles of DP array 102. Though the kernels are tailored for a particular type of machine learning model, each kernel may be generalized in the sense that certain operative features of the kernel may be altered or configured at runtime through the use of runtime parameters. Thus, depending on the type of machine learning model that is implemented by application 202, application 202 will utilize a different type of kernel. In addition, in one or more example implementations, multiple kernels may be loaded into a same compute tile. The particular kernel or kernels to be executed in that case, in a given compute tile, may be selected on a per layer basis for application 202.

Within this disclosure, a kernel represents one or more functions. In some arrangements, a kernel includes a plurality of different functions. In other arrangements, the program code is arranged so that different functions are implemented as different (e.g., multiple) kernels. In either case, runtime parameters are capable of configuring one or more operational parameters of a kernel. In some cases, the configuration selectively enables/disables one or more functions of a kernel so that the function(s) execute or do not execute. In some cases, runtime parameters may select a particular function or kernel from a plurality of such functions/kernels for execution.

In the example of FIG. 2, application 202 may specify a plurality of layers 1 through M. As an example, each layer 1-M of application 202 may correspond to a particular set of operations referred to as a workload that is performed by the layer. In one example, each layer may specify a particular matrix multiply operation that is to be performed. Different layers may have different dimensions of the matrices that are to be multiplied together. For example, the matrices to be multiplied by layers 1-M may have different numbers of columns and/or different numbers of rows from one layer to the next. For example, two matrix multiply operations that multiply matrices of different dimensions may be considered different matrix multiply operations.

Each layer of application 202 may include one or more particular functions to be performed. Examples of different functions that may be performed in different layers of application 202 can include, but are not limited to, convolution, General Matrix Multiply (GEMM), Rectified Linear Unit (ReLU), batch normalization, or other function(s) generally known in the field of machine learning and/or neural networks.

As an illustrative and non-limiting example, consider the case where application 202 implements a CNN. The CNN may include different layers 1-M where the different layers have different dimensions that process differing columns and rows of pixels of an image. Further, for purposes of illustration, layer 1 of application 202 may be a 2-dimensional (2D) convolution layer. Layer 2 of application 202 may be a 2D convolution layer with batch normalization. Layer M of application 202 may be a 2D convolution layer with ReLU. The example application and layers are provided for purposes of illustration and not limitation.

Compiler 204 is capable of receiving application 202 and one or more overlays 206. In one aspect, each of overlays 206 may be a prebuilt definition of how data is to move among tiles of DP array 102 to implement a layer (or a portion of a layer) of application 202 (e.g., a particular machine learning model). In general, overlays 206 represent all possible overlays available for the particular type of machine learning model implemented by application 202. Each overlay 206, for example, may specify a different mode of data movement for the application as implemented in DP array 102. The mode of data movement uses stream channels implemented in DP array 102 by application 202 as compiled. That is, the stream channels established by application 202 may remain in place while different modes of data movement are implemented over time using different ones of overlays 206. Each overlay uses the same stream channel implementation for application 202.

In one aspect, an overlay may specify data movement via the stream channels by dictating the type of input data that is conveyed over the various stream channels. Examples of different types of input data include feature maps and weights. Some stream channels may convey feature maps while others convey weights. In one aspect, each overlay 206 defines stream channels as logical connections among different tiles of DP array 102 that are needed to implement, e.g., efficiently implement, particular layers of a given machine learning model. Example overlays 206 and the corresponding modes of data movement implemented by the overlays are further illustrated in the example of FIG. 8.

Accordingly, as defined within this disclosure, the term "overlay" means data that is provided to a DP array during runtime of an application implemented therein, where the data defines a mode of data movement in at least a portion of the DP array to implement a particular layer of the application.

Continuing with the example where application 202 specifies a CNN type of machine learning model, each overlay 206 is prebuilt for a CNN type of machine learning model to implement layers of such a machine learning model within DP array 102. In one aspect, each overlay 206 is suited to process data for a layer of application 202 having a particular shape. In the example, overlay 206-1 is capable of efficiently processing data for a square-shaped layer. Overlay 206-2 is capable of efficiently processing data for a tall rectangular-shaped layer. Overlay 206-N is capable of efficiently processing data for a wide rectangular-shaped layer. Thus, in this example, overlays 206 are not limited to processing layers having particular dimensions, though this also may be the case, but rather are intended to handle layers of particular shapes. It should be appreciated that fewer or more overlays for a given type of application may be created for shapes as described herein or for different shapes.

Compiler 204 is capable of comparing the available, prebuilt overlays 206 with the layers 1-M of the application 202 to determine a mapping of overlays 206 to layers 1-M of application 202. Overlays 206 are particular to the type of application 202. Overlays 206 also may be particular to the architecture of DP array 102. Were application 202 to implement a different type of machine learning model, for example, the prebuilt overlays available for compiler 204 to map to layers of the application would be different. The overlays available would be suited to implement the particular types of data movements needed for the particular type of machine learning model being implemented. Accordingly, the overlays 206 used in the mapping by compiler 204 will include only those overlays that are prebuilt for the particular type of machine learning model implemented by application 202.

In one aspect, compiler 204 is capable of mapping overlays 206 to layers 1-M of application 202 by determining a shape of each layer. The shape may be given by the particular weights or weight matrix of the layer. Compiler 204 is capable of matching the shape of each layer to a particular overlay 206 (e.g., a shape of an overlay 206) that is suited for operating on layers of the determined shape. While same shape and/or similarity in shape is used for purposes of mapping overlays to layers, in another aspect, compiler 204 is capable of determining the dimensions of each layer and mapping that layer to a particular (e.g., one) overlay 206 suited to the layer based on dimensions, which may be used as a proxy for shape. By mapping overlays 206 to layers 1-M according to shape, the data throughput achieved by DP array 102 in implementing each layer of application 202 using the mapped overlay may be increased or optimized.

Though overlays 206 appear to correspond to the layers of application 202 in the example of FIG. 2 on a one-to-one basis, this need not be the case. That is, compiler 204 may have access to or include a plurality of pre-built overlays 206 for different types of machine learning models that are available for compiling applications. The number of overlays 206 may be higher or lower than the number of layers of the application being compiled.

Compiler 204 is capable of generating an executable version of application 202 shown as application 208. Application 208 is executable by DP array 102. For example, application 208 specifies executable versions of the kernels that are executed by particular ones of the compute tiles of DP array 102. In this regard, application 208 not only specifies kernels, but also may specify which compute tile executes each respective kernel. In one aspect, application 208 utilizes a single, or same, kernel, where each compute tile used to execute application 208 executes an instance of the kernel. The kernel may include a plurality of different and selectable functions. In other examples, each compute tile used to execute application 208 executes an instance of each of a plurality or set of different kernels. The set of kernel instance(s) executed by each compute tile executing application 208 may be the same or different from one compute tile to another. As part of application 208, compiler 204 also generates configuration data that, when loaded into DP array 102, implements the stream channels in DP array 102 that convey data. Application 208 may also specify initialization data for the various memories of DP array 102.

As noted, compiler 204 is also capable of generating a control application 214 that is executable by array controller 106. Control application 214 can include a mapping 210 and runtime parameters 212. Mapping 210 specifies which overlay 206 to use for each of layers 1-M of application 208 during execution (e.g., runtime) of application 208. Runtime parameters 212 may be generated for one or more or for each of layers 1-M of application 208. That is, runtime parameters 212 are layer-specific. Further, runtime parameters 212 may be specific to particular compute tiles. In general, runtime parameters 212 may be provided to different compute tiles of DP array 102 during runtime to configured kernels for execution. Runtime parameters 212, for example, may select a particular kernel for execution and/or enable and/or disable particular functions of kernels to execute (e.g., effectuate a change in the execution flow of any of the various kernels being executed by a compute tile). Further details relating to the runtime parameters are described in greater detail below.

In one aspect, control application 214 may specify a schedule that is followed by array controller 106 that initiates implementation of overlays 206 and runtime parameters 212 for the different layers of application 208 during runtime. The schedule further may specify the particular tasks to be performed and an ordering of the tasks to initiate the workloads of the various layers of application 208 during runtime.

In implementing an application in DP array 102, array controller 106 is capable of loading application 208 into program memories of compute tiles, loading configuration data of application 208 into control registers to configure stream switches to implement the stream channels, and initializing memories of DP array 102. In executing control application 214, array controller 106 is capable of implementing different overlays and loading runtime parameters in DP array 102 for application 208 during runtime per the schedule specified. Further, array controller 106, in executing control application 214, initiates workloads for application 208 corresponding to the different layers of application 208 over time per the schedule.

Within this disclosure, reference is made to loading and executing an application in DP array 102. It should be appreciated that DP array 102 may be subdivided into 1, 2, or more partitions, where each partition may include one or more compute tiles and one or more interface tiles; or, a combination of one or more compute tiles, one or more memory tiles, and one or more interface tiles. Each partition is capable of operating independently of the other partition(s) such that each partition may execute a different application and do so concurrently with other partitions. Accordingly, within this disclosure, references to loading, executing, or implementing an application in a partition of the DP array 102, loading overlays, loading runtime parameters, and/or executing workloads may refer to the case where the entire DP array 102 is viewed as a single partition and such operations are performed for the single partition, or where DP array 102 is subdivided into two or more smaller partitions and the operations are performed for each of the two or more smaller partitions independently under control of one or more array controllers.

Figure 3:
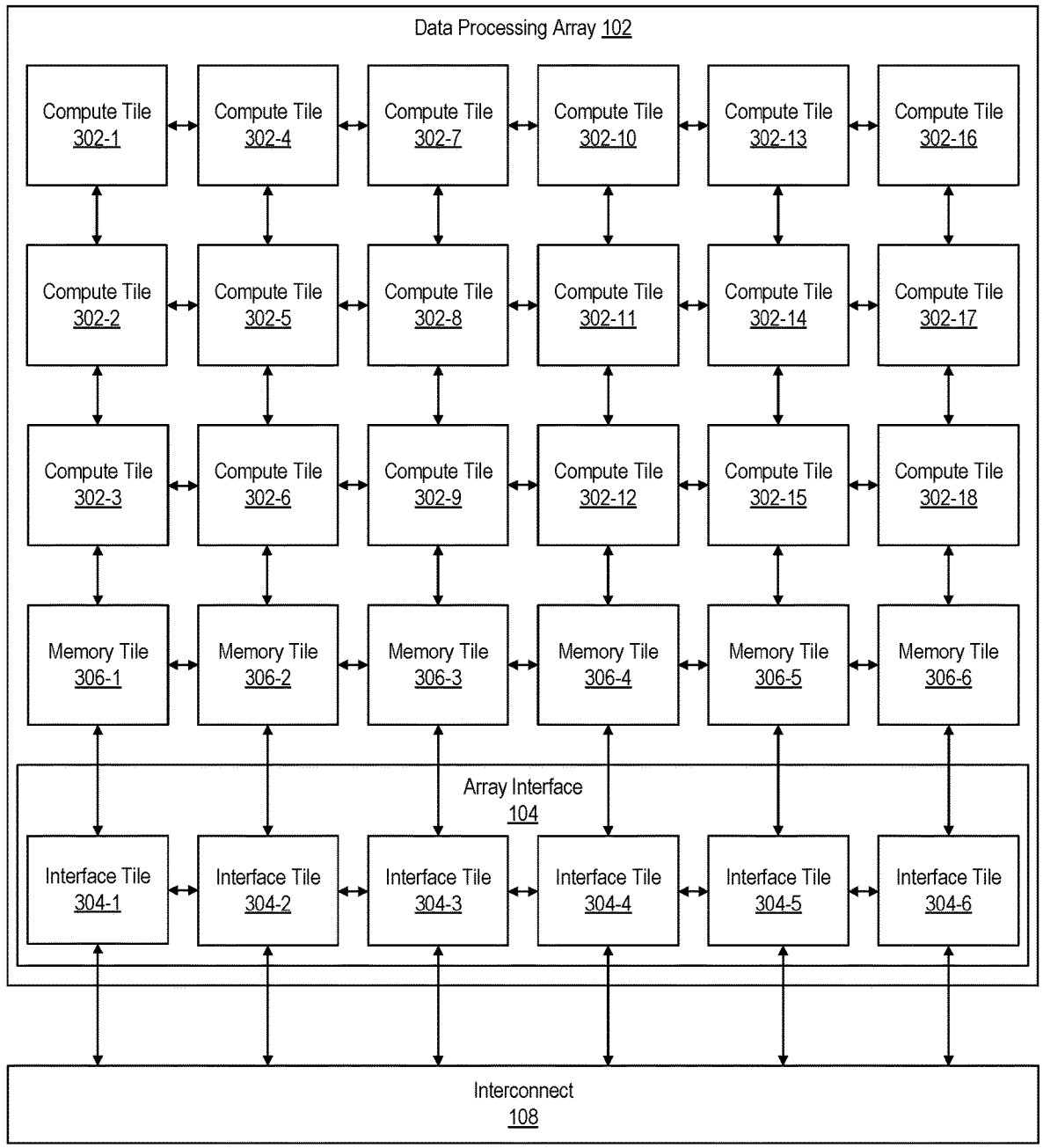
FIG. 3 illustrates an example implementation of a DP array.

FIG. 3 illustrates an example implementation of DP array 102. In the example, DP array 102 includes compute tiles 302, memory tiles 306, and interface tiles 304. Interface tiles 304 are part of array interface 104. In the example, compute tiles 302 and memory tiles 306 are arranged in a grid having a plurality of rows and columns. Interface tiles 304 are arranged in a row where the individual interface tiles 304 are aligned with the columns of the grid arrangement of DP array 102. Compute tiles 302 include compute tiles 302-1, 302-2, 302-3, 302-4, 302-5, 302-6, 302-7, 302-8, 302-9, 302-10, 302-11, 302-12, 302-13, 302-14, 302-15, 302-16, 302-17, and 302-18. Interface tiles 304 include interface tiles 304-1, 304-2, 304-3, 304-4, 304-5, and 304-6. Memory tiles 306 include memory tiles 306-1, 306-2, 306-3, 306-4, 306-5, and 306-6. In the example, each tile is coupled to an adjacent tile to the left (west), right (east), above (north), and below (south) if such a tile is located in such position(s).

The example of FIG. 3 is provided for purposes of illustration only. The number of tiles in a given column and/or row, the number of tiles included in DP array 102 and/or array interface 104, the sequence or order of tile types (e.g., memory and compute tiles) in a column and/or row is for purposes of illustration and not limitation. Other arrangements may be included with varying numbers of tiles, rows, columns, mixtures of tile types, and the like. For example, rows of FIG. 3 are homogeneous in terms of tile type while columns are not. In other arrangements, rows may be heterogeneous in terms of tile type while columns are homogeneous. Further, additional rows of memory tiles 306 may be included in DP array 102. Such rows of memory tiles 306 may be grouped together without intervening rows of compute tiles 302 or distributed throughout DP array 102 such that rows of compute tiles 302 do intervene between rows or groups of rows of memory tiles 306.

In another example implementation of DP array 102, memory tiles 306 may be omitted such that the bottom row of compute tiles 302 couples directly to interface tiles 304. For example, with memory tiles 306 omitted, interface tile 304-1 would connect directly to compute tile 302-3, etc. In such cases, the various example implementations described herein may read data from and write data to a memory (e.g., one of subsystems 112-120) in lieu of memory tiles 306. The inclusion of memory tiles 306, however, may increase the data throughput of DP array 102 in that data may be stored closer to compute tiles 302 without having to continually read data from a RAM and/or write data to a RAM external to DP array 102.

Figure 4:
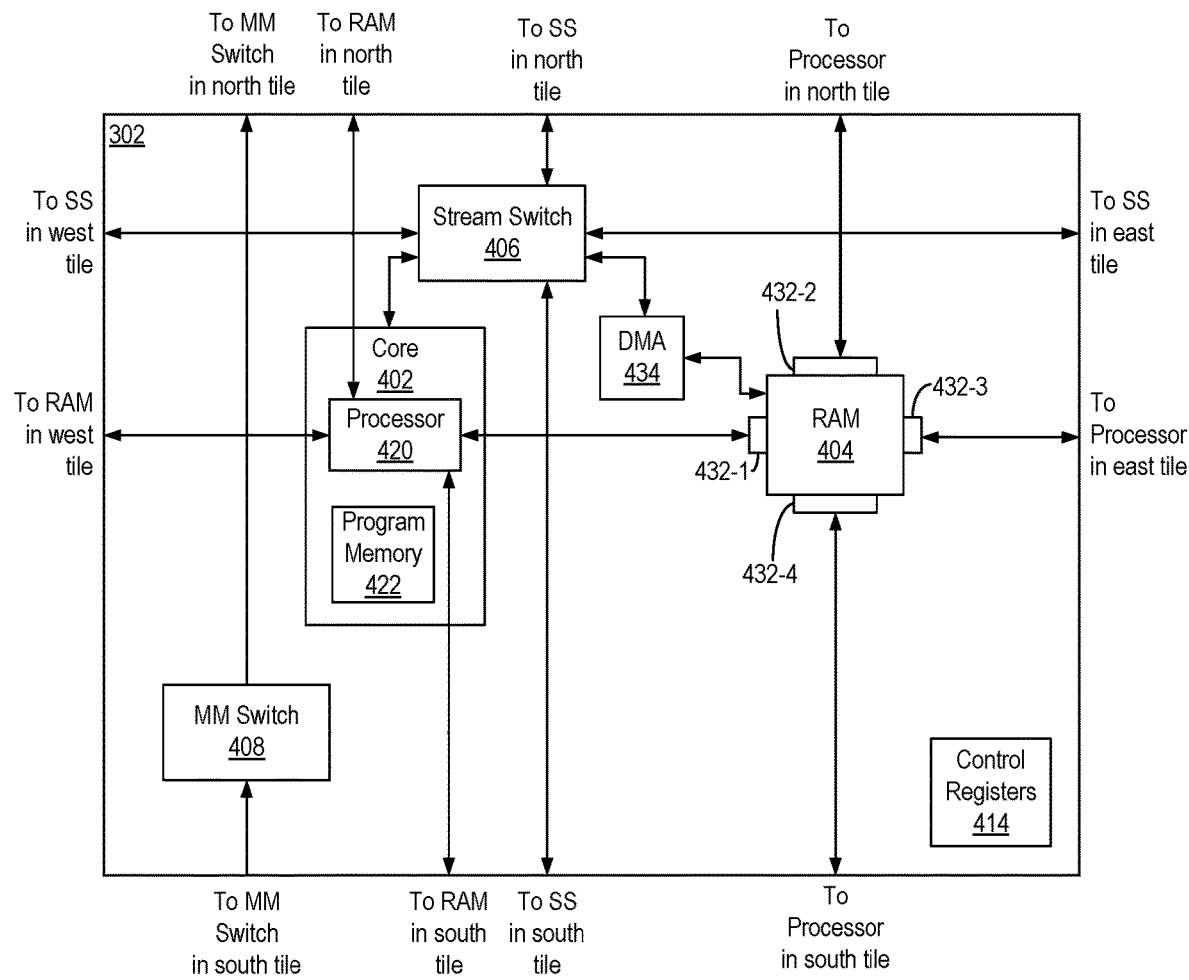
FIG. 4 illustrates an example implementation of a compute tile of a DP array.

FIG. 4 illustrates an example implementation of a compute tile 302. The example of FIG. 4 is provided to illustrate certain architectural features of compute tiles 302 and not as a limitation of the form of DP array 102 or the architecture of compute tiles 302 in general. Some connections between components and/or tiles are omitted for ease of illustration.

In the example, each compute tile 302 includes a core 402, a RAM 404, a stream switch 406, a memory-mapped switch 408 (e.g., abbreviated as "MM" switch in the figures), control registers 414, and a direct memory access (DMA) circuit 434. Core 402 includes a processor 420 and a program memory 422. Control registers 414 may be written by memory-mapped switch 408 to control the operation of the various components included in compute tile 302. Though not shown, each memory component of compute tile 302 (e.g., program memory 422, control registers 414, and RAM 404) may be read and/or written via memory-mapped switch 408 for purposes of configuration and/or initialization.

Processor 420 may be any of a variety of different processor types. In one aspect, processor 420 is implemented as a vector processor. In another example, processor 420 may be implemented as a scalar processor. In another example, processor 420 may include a vector processor and a scalar processor. Program memory 422 may be loaded, e.g., by way of loading an application, with executable instructions referred to as a "kernel." Each compute tile 302 is capable of performing data processing operations and operating on a large amount of data through execution of the kernel(s) stored in program memory 422 by processor 420.

Each core 402, e.g., processor 420, is directly connected to the RAM 404 located in the same compute tile 302 through a memory interface 432. Within this disclosure, a memory interface is referred to as a "local memory interface" when the memory interface is used by circuits in the same tile to access a RAM. Memory interface 432-1 is an example of a local memory interface since processor 420 in the same tile utilizes the memory interface to access RAM 404. By comparison, a memory interface used by circuitry external to the tile to access RAM 404 is referred to as an adjacent memory interface. Memory interfaces 432-2, 432-3, and/or 432-4 are examples of adjacent memory interfaces because such memory interfaces are used by circuitry in other adjacent tiles to access RAM 404.

As such, each processor 420 is capable of accessing (e.g., reading and/or writing) the RAM 404 in the same compute tile 302 and one or more other RAMs 404 in adjacent tiles via standard read and write operations directed to such memory interfaces. RAM 404 is configured to store application data. RAM 404 may be read and/or written via memory-mapped switch 408 for purposes of configuration and/or initialization. RAM 404 may be read and/or written by a processor 420 and/or by DMA circuits 434 during runtime.

DMA circuit 434 is capable of reading and writing data to RAM 404 located in the same compute tile 302. DMA circuit 434 may receive data via stream switch 406 from a source outside of compute tile 302 and store such data in RAM 404. DMA 434 may read data from RAM 404 and output the data to stream switch 406 for conveyance to one or more other destinations outside of compute tile 302.

Each core 402, e.g., processor 420, may be directly connected to RAMs 404 located in adjacent compute tiles 302 (e.g., in the north, south, east, and/or west directions) via memory interfaces. As such, processor 420 may directly access such other adjacent RAMs 404 in the same manner as processor 420 is able to access the RAM 404 located in the same compute tile 302 without initiating read or write transactions over stream switch 406 and/or without using DMA circuit 434. As an illustrative example, processor 420 of compute tile 302-5 may read and/or write to the RAM 404 located in compute tiles 302-5, 302-2, 302-4, and 302-6 without submitting read or write transactions over stream switches 406 and/or using DMA circuits 434. It should be appreciated, however, that a processor 420 may initiate read and write transactions to the RAM 404 of any other compute tile 302 and/or memory tile 306 via stream switches 406 and DMA circuits 434.

Processors 420 may also include direct connections, referred to as cascade connections (not shown), to processors 420 of adjacent cores (e.g., in the north, south, east, and/or west directions) that allow direct sharing of data stored in internal registers (e.g., an accumulation register) of processor 420 with other processors 420. This means that data stored in one or more internal registers of one processor 420 may be conveyed directly to one or more internal registers of a different processor 420 without first writing such data to RAM 404 and/or conveying such data over stream switches 406 using DMA circuits 434.

In the example of FIG. 4, the loading of application 208 within DP array 102 by array controller 106 loads the executable program code of kernels in the respective program memories 422 of the compute tiles 302. Operation of other components of compute tile 302 such stream switches 406 may be controlled by loading configuration data of application 208 into control registers 414 to implement the stream channels (e.g., logical connections). Different overlays 206 may be loaded to implement different modes of data movement via the stream channels to implement different layers of application 208.

Runtime parameters 212 may be loaded into RAMs 404 by array controller 106. That is, the kernels as executed by processors 420 may include instructions that cause the processor 420 to read values of the runtime parameters 212 from a particular area of RAM 404 that may be reserved for storing runtime parameters 212. Based on the values of any runtime parameters 212 that may be stored in RAM 404, kernel(s) executed by the compute tile 302 may be configured. For example, execution of the kernel(s) may be changed by loading certain runtime parameters 212. In another aspect, processor 420 may execute a function that selects a particular kernel or function of a kernel to be executed based on the runtime parameters 212 read from RAMs 404. It should be appreciated that the particular runtime parameters loaded into RAM 404 of one compute tile 302 may differ from the runtime parameters (if any) loaded into another RAM 404 of another, different compute tile 302. Runtime parameters 212 may be changed for each layer of application 208 implemented.

For purposes of illustration, consider the prior example where application 208 implements a CNN. The runtime parameters 212 for one layer may configure the kernels executed by processors 420 to perform a particular matrix multiply operation. The runtime parameters, for example, may specify the dimension(s) of the matrix multiply operation to be performed. In another example, the runtime parameters 212 may specify particular functions of the kernel to be executed or a different kernel to be executed. For example, runtime parameters 212 for a first layer may indicate the dimensions of the layer and that a convolution operation is to be performed. Runtime parameters 212 loaded for a different layer may specify different dimensions of the layer and that convolution and batch normalization are to be performed. Runtime parameters 212 loaded for yet a different layer may specify the dimensions of the layer and that convolution and ReLU are to be performed. In this example, the different functions, e.g., convolution, batch normalization, and ReLU may be implemented as different functions of the general CNN kernel that may be selectively executed based on the particular runtime parameters 212 loaded for that layer. That is, the runtime parameters 212 configure the kernel to execute particular functions. In another example, the different functions may be implemented as different kernels that are selected for execution and configured by runtime parameters 212.

Figure 5:
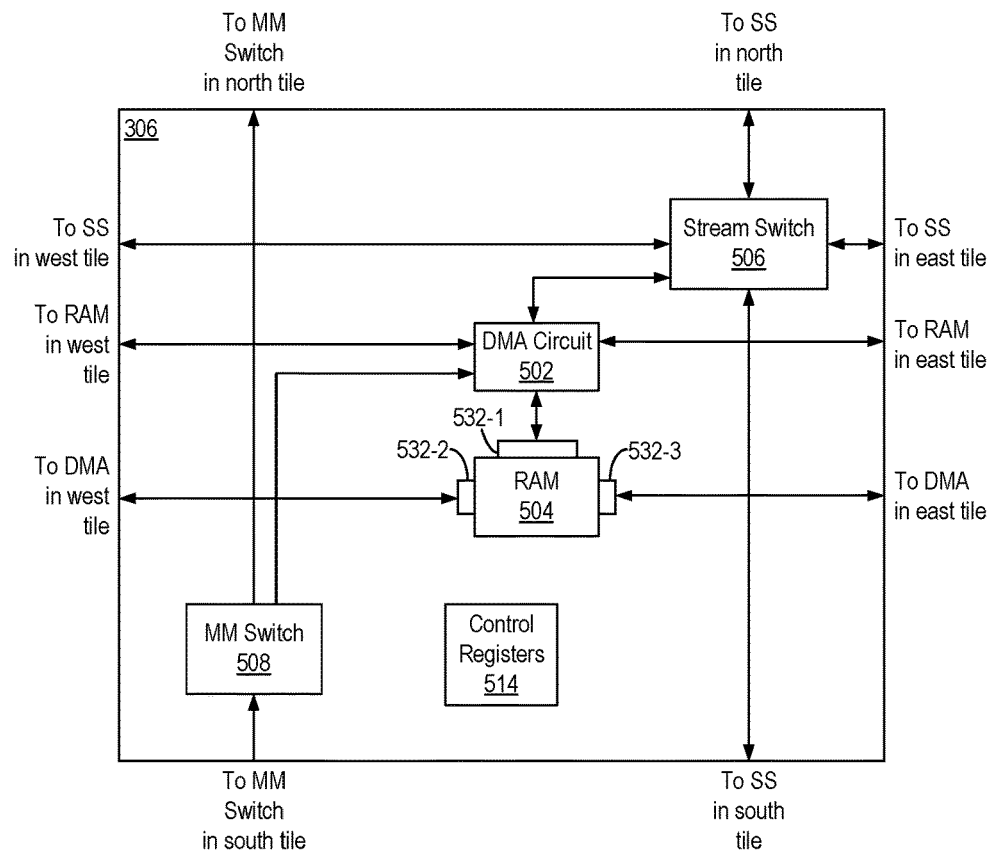
FIG. 5 illustrates an example implementation of a memory tile of a DP array.

FIG. 5 illustrates an example implementation of a memory tile 306. The example of FIG. 5 is provided to illustrate certain architectural features of memory tiles 306 and not as a limitation of the form of DP array 102 or architecture of memory tiles 306 in general. Some connections between components and/or tiles are omitted for ease of illustration.

Each memory tile 306 includes a DMA circuit 502, a RAM 504, a stream switch 506, a memory-mapped switch 508, and/or control registers 514. Control registers 514 may be written by memory-mapped switch 508 to control the operation of the various components illustrated in memory tile 306. Though not shown, each memory component of memory tile 306 (e.g., RAM 504 and control registers 514) may be read and/or written via memory-mapped switch 508 for purposes of configuration and/or initialization.

Each DMA circuit 502 of a memory tile 306 is coupled to the RAM 504 within the same memory tile 306 via a local memory interface 532-1 and may be coupled to one or more RAMs 504 of other adjacent memory tiles 306. In the example of FIG. 5, each DMA circuit 502 is capable of accessing (e.g., reading and/or writing) the RAM 504 included within the same memory tile 306 via local memory interface 532-1. RAM 504 includes adjacent memory interfaces 532-2 and 532-3 through which the DMA circuits of the east and west memory tiles 306 may access RAM 504. For example, the DMA circuit 502 of memory tile 306-2 may access the RAM 504 of memory tile 306-1 and/or the RAM 504 of memory tile 306-3. DMA circuit 502 in the example may read and/or write RAMs of adjacent memory tiles 306 by way of adjacent memory interfaces of the RAMs of such other memory tiles. DMA circuit 502 may place data read from RAM 504 onto stream switch 406 and write data received via stream switch to RAM 504.

Similar to the example of FIG. 4, memory-mapped switch 508 is used for purposes of configuration and initialization of memory tile 306 and stream switch 506 is used for conveying data during runtime. In one aspect, RAM 504 may be initialized as part of the process of loading application 208 into DP array 102. Loading application 208 also loads configuration data into control registers 514 that configure stream switches 506 to implement the stream channels. Different overlays 206 described in connection with FIG. 2 may be loaded to implement particular modes of data movement.

In the examples described herein, certain tiles may include one or more common or similar components such as memory-mapped switches, stream switches, and/or DMA circuits. It should be appreciated, however, that memory tiles 306 are generally characterized by the lack of a processing element (e.g., processor 420) included therein.

Figure 6:
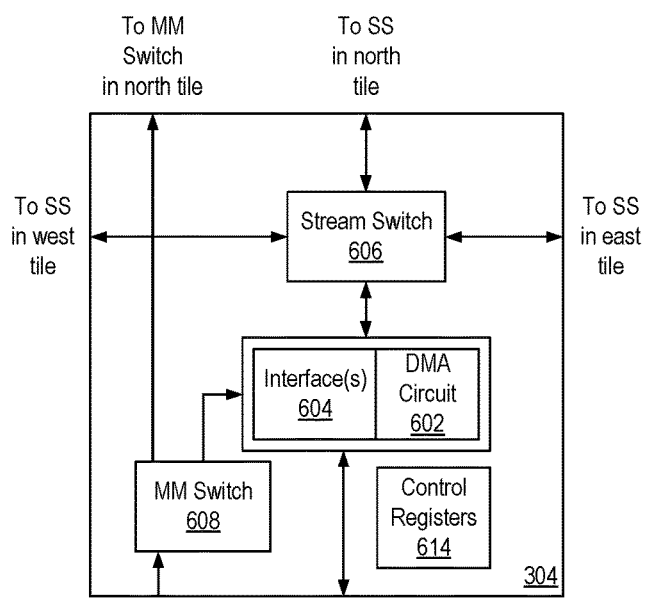
FIG. 6 illustrates an example implementation of an interface tile of a DP array.

FIG. 6 illustrates an example implementation of an interface tile 304. The example of FIG. 6 is provided to illustrate certain architectural features of interface tiles 304 and not as a limitation of the form of DP array 102. Some connections between components and/or tiles are omitted for ease of illustration.

In the example, each interface tile 304 includes a DMA circuit 602, one or more interfaces 604, a stream switch 606, a memory-mapped switch 608, and control registers 614. In other example implementations, not every interface tile 304 includes a DMA circuit 602. Array interface 104 is operative as an interface between array tiles of DP array 102 and other circuits of system 100 by way of interconnect 108. In the example of FIG. 6, interface tiles 304 couple to memory tiles 306. In other example implementations, interface tiles 304 couple to compute tiles 302 depending on whether DP array 102 includes memory tiles 306 and/or the location of such memory tiles 306 within DP array 102. Through interconnect 108, interface tiles 304 are capable of coupling to one or more other circuits within system 100 and/or external to the system. Such other circuits may include one or more hardwired circuits and/or subsystems, circuits and/or subsystems implemented in programmable logic, or the like.

In the example of FIG. 6, interface(s) 604 are capable of connecting to other systems and/or circuits of the system. For purposes of illustration, interface(s) 604 are capable of coupling to a NoC, to programmable logic, to an embedded processor and/or processor system (independent of DP array 102), to a platform management controller embedded in the IC, and/or one or more other hardwired circuit blocks (e.g., ASIC blocks) within the IC. For example, interface 604 may include or provide direct connections to array controller 106 and/or one or more of the subsystems 112-120. In another arrangement, interfaces 604 may be configured to communicate with circuits and/or systems located in the same package as DP array 102 but implemented in a different die within the package. In still another arrangement, interfaces 604 may be configured to communicate with circuits and/or systems located external to the IC that includes DP array 102 (e.g., to circuits and/or systems external to the package).

Interface tiles 304 are capable of conveying data, whether application runtime data via stream switches 606 or an application via memory-mapped switches 608, to the array tiles located above each respective interface tile 304 as received via interconnect 108 and/or send such data out to other circuits via interconnect 108. Further, interface tiles 304 are configurable by loading an application (e.g., including configuration data) into control registers 614 of each respective interface tile 304 by way of memory-mapped switches 608. Array controller 106, for example, may write the configuration data to control registers 614.

Within DP array 102, taken collectively, the stream switches (406, 506, and 606) form a stream network that is capable of conveying application runtime data (as differentiated from an application itself). Application runtime data includes data that is received, operated on, or generated (e.g., output) by an array tile (e.g., a compute tile 302) of DP array 102 during runtime of an application. Application runtime data is generally stored, during runtime, in RAMs 404 and RAMs 504 and conveyed over the stream channels implemented by the stream switches as configured by the application. Taken collectively, the memory-mapped switches (408, 508, and 608) form a memory-mapped network through which an application may be loaded into DP array 102. In one aspect, overlays 206 and/or runtime parameters 212 may be conveyed over the memory-mapped network. In another aspect, overlays 206 and/or runtime parameters 212 may be conveyed over the stream network. Tasks that initiate workloads may be conveyed (e.g., to DMA circuits 434, 502, and/or 602) over the memory-mapped network. In another aspect, the tasks may be conveyed over the stream network.

Referring to DP array 102, configuration data written to the control registers (414, 514, and 614) of a tile may also control whether the stream switch of the tile operates as a circuit-switching stream interconnect or a packet-switched stream interconnect. A circuit-switching stream interconnect is capable of implementing point-to-point, dedicated streams that are suitable for high-bandwidth communication among tiles of DP array 102. A packet-switching stream interconnect allows streams to be shared to time-multiplex multiple logical streams onto one physical channel for medium bandwidth communication. As such, stream switches may be configured to implement a packet-switched stream network over which application data may be conveyed.

Figure 7:
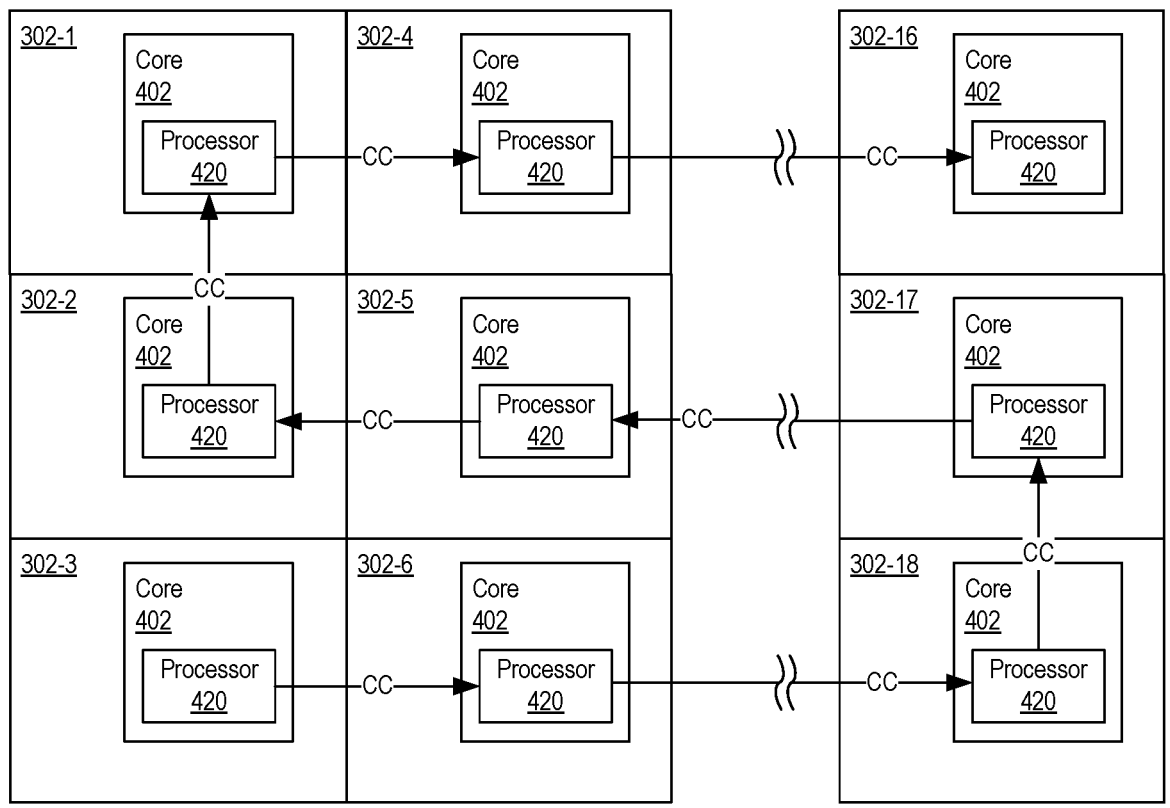
FIG. 7 illustrates an example of cascade connectivity between compute tiles of a DP array.

FIG. 7 illustrates an example of cascade connectivity between compute tiles 302. For purposes of illustration, only a subset of the compute tiles 302 of DP array 102 are illustrated. In the example, processors 420 of cores 402 may be directly connected to one or more other processors 420 of adjacent cores 402. The direct connections between processors 420 are referred to herein as "cascade connections" and are labeled as "CC" in the example of FIG. 7. The cascade connections are operable independently of sharing data via RAMs 404, 504 and/or stream switches. In the example of FIG. 7, each processor 420 is coupled to an adjacent processor 420 via a cascade connection. In other examples, processors 420 may be connected to other processors via a plurality of cascade connections.

Each cascade connection may be seen by a processor as an outgoing cascade connection or an incoming cascade connection. For example, the cascade connection from compute tile 302-3 to compute tile 302-6, from the perspective of processor 420 of compute tile 302-6, may be referred to as the incoming cascade connection. The cascade connection from compute tile 302-6 to the adjacent compute tile to the right, from the perspective of processor 420 of compute tile 302-6, may be referred to as the outgoing cascade connection.

Each cascade connection may convey a multi-bit data stream (e.g., up to hundreds of bits in parallel) from one processor 420 to another. In one aspect, the cascade connections are capable of outputting the contents of an accumulation register within processor 420 and conveying the contents, e.g., multiple bits each clock cycle, to another internal register of an adjacent processor 420. The receiving register may feed into or be coupled to the accumulation register in the receiving processor 420. An accumulation register is a type of register included in a processor that acts as a temporary storage location capable of holding an intermediate value generated during operation of the processor. Intermediate results of an operation may be progressively written to the accumulation register, overwriting previous values. As noted, each cascade connection allows data to be conveyed from one processor 420 directly to another processor 420 without first storing the data in a RAM or utilizing a stream switch and/or DMA circuit.

Each cascade connection may be independently enabled so that data is propagated on the cascade connection from one processor 420 to another or disabled so that no data is propagated on the cascade connection. In one aspect, each cascade connection may be selectively enabled based on the program code of the kernel executed by the respective processor 420. That is, the program code of the kernel may include instructions that cause a processor 420 to write data to an outgoing cascade connection or to read data from an incoming cascade connection. These instructions may be executed or skipped by way of writing suitable runtime parameters 212 for an overlay 206 that causes a given processor 420 to execute the functions for reading data from and/or writing data to cascade connections.

In another example, runtime parameters 212 may be used to specify addressing used by a processor 420 in executing a kernel. The runtime parameters 212, for example, may be used to shift the addressing so that the processor writes to the RAM 404 in the same compute tile, to a particular adjacent RAM 404, and/or to another memory via DMA circuit and stream switch. In this manner, the movement of data within DP array 102 may be further modified by way of loading appropriate runtime parameters 212 for the respective overlays 206 loaded during runtime of application 208.

In another example, the runtime parameters 212 may select a kernel to execute in a compute tile 302 that is configured to communicate using an incoming and/or outgoing cascade connection or select a different kernel that may be functionally similar or the same but that does not utilize cascade connections.

Figure 8:
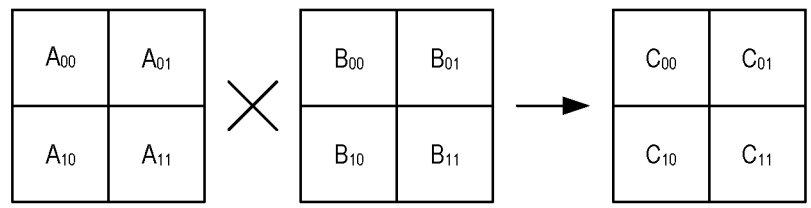
FIG. 8. illustrates an example in which a compute tile is configured to operate without the use of a cascade connection to another compute tile.
Figure 8:
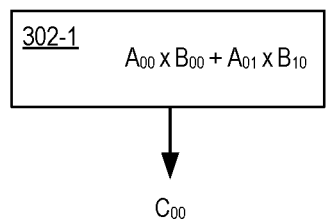

FIG. 8. illustrates an example in which compute tile 302-1 is configured to operate without the use of a cascade connection to another compute tile. The configuration illustrated in FIG. 8 may be implemented by loading an overlay and optionally runtime parameters into DP array 102. For purposes of discussion, an overlay that does not utilize cascade connections is referred to herein as a "non-cascade overlay." Similarly, the mode of operation implemented in DP array 102 by a non-cascade overlay may be referred to as a "non-cascade mode." In non-cascade mode, processors 420 of compute tiles 302 do not communicate by way of cascade connections.

In the example of FIG. 8, using a non-cascade overlay, compute tiles 302 are configured to perform matrix multiply operations. In other examples, compute tiles 302 may perform other types of operations. For purposes of illustration, DP array 102 is used to multiply matrices A and B to generate matrix C. Each compute tile 302 of a partition of DP array 102 in the non-cascade mode is configured to generate one element of matrix C.

In the example, compute tile 302-1 generates the dot product of the first row of matrix A with the first column of matrix B to generate element Coo. That is, compute tile 302-1 is programmed to calculate $(A_{00} \times B_{00}) + (A_{01} \times B_{10})$. In the example of FIG. 8, the elements $A_{00}$, $B_{00}$, $A_{01}$, and $B_{10}$ are provided to compute tile 302-1 via one or more input stream channels implemented in the stream network as part of the application.

As such, a DP array (or partition thereof) having 8 compute tiles is capable of generating 8 output elements in parallel. In this configuration using the non-cascade overlay, DP array 102 is capable of computing matrix C in parallel using 4 compute tiles 302. Each of the 4 compute tiles 302 computes one of elements $C_{00}$, $C_{01}$, $C_{10}$, and $C_{11}$ of matrix C in parallel.

Figure 9:
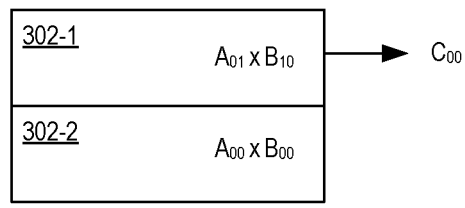
FIG. 9. illustrates an example in which compute tiles are configured to operate using a cascade connection.

FIG. 9. illustrates an example in which compute tiles 302-1 and 302-2 are configured to operate using a cascade connection. The configuration illustrated in FIG. 9 may be implemented by loading an overlay and optionally runtime parameters into DP array 102. For purposes of discussion, an overlay that does utilize one or more cascade connections is referred to herein as a "cascade overlay." Similarly, the mode of operation implemented by a cascade overlay may be referred to as a "cascade mode" where processors 420 of selected compute tiles 302 communicate by way of cascade connections. It should be appreciated that in some cases, selected processors 420 may communicate solely using cascade connections whereas in other cases such processors may communicate using a combination of cascade connections and stream channels (e.g., the stream network).

In the example of FIG. 9, using a cascade overlay, compute tiles 302 are configured to perform matrix multiply operations. In other examples, compute tiles 302 may perform other operations. For purposes of illustration, DP array 102 is used to multiply matrices A and B to generate matrix C. In the example of FIG. 9, pairs of compute tiles 302 operate cooperatively to generate one element of the matrix C. FIG. 9 shows that the processors 420 of compute tile 302-1 and compute tile 302-2 are coupled by a cascade connection. As such, compute tile 302-2 is capable of calculating $A_{00} \times B_{00}$ while compute tile 302-1 is capable of calculating $A_{01} \times B_{10}$ and summing the products.

For example, $A_{00}$ and $B_{00}$ are provided to compute tile 302-2 via one or more input stream channels implemented in the stream network. Elements $A_{01}$ and $B_{10}$ are provided to compute tile 302-1 via one or more input stream channels implemented in the stream network. The result of $A_{00} \times B_{00}$ may be output from the accumulation register of the processor 420 of compute tile 302-2 via a cascade connection to processor 420 of compute tile 302-1. Processor 420 of compute tile 302-1 then computes $A_{01} \times B_{10}$ and sums the two products.

The configuration of FIG. 9 is capable of computing element Coo of matrix C in less time (e.g., using fewer clock cycles) than the example of FIG. 8, but utilizes two compute tiles 302 rather than 1 to compute each element of matrix C. Accordingly, a DP array having 8 compute tiles using the cascade mode of FIG. 9 is able to generate 4 elements concurrently as opposed to 8. Each cascade connected pair of compute tiles 302 is capable of calculating an output element using fewer clock cycles than one compute unit from the example of FIG. 8. In this configuration, using the cascade overlay, computing matrix C may be performed in parallel using all 8 compute tiles of DP array 102 where each set of two cascade connected compute tiles computes one of $C_{00}$, $C_{01}$, $C_{10}$, and $C_{11}$ in parallel.

In one or more example implementations, cascade connections may be disabled by the processor 420 of a compute tile 302 executing a non-cascade kernel. A non-cascade kernel is a kernel that does not include any programming or instructions that cause the processor 420 to read data from a cascade connection or write data to a cascade connection. Similarly, cascade connections may be enabled by the processor 420 of a compute tile 302 executing a cascade kernel. A cascade kernel is a kernel that does include programming or instructions that cause the processor 420 to read data from a cascade connection or write data to a cascade connection.

For example, in one or more example implementations, each overlay may specify a particular kernel to be executed by each compute tile 302 to achieve desired connectivity and/or functionality. Upon initial configuration of DP array 102, each program memory 422 may be loaded with one or more different kernels. Each kernel, as executed by the processor 420 in the same compute tile 302, dictates whether cascade connections are to be used. In this example, kernels may be of a first type that uses cascade connections or a second type that does not use cascade connections. Of the first type of kernel that uses cascade connections, one or more kernels may be configured to read data from a cascade connection (e.g., a read cascade kernel), one or more kernels may be configured to write data to a cascade connection (e.g., a write cascade kernel), and one or more kernels may be available to read data from a cascade connection and write data to a cascade connection. Another type of kernel, referred to as an activation kernel, also may be included in program memory 422. The activation kernel may implement a selected activation function. In one aspect, the activation kernel may implement the Rectified Linear (ReLU) activation function. It should be appreciated that an activation kernel may implement other activation functions. In an example, the particular kernel(s) to be executed (e.g., cascade and/or non-cascade and/or the particular activation function to be executed) may be specified by runtime parameters 212.

Referring to the example of FIG. 7, compute tiles connected by enabled cascade connections in the cascade mode may operate cooperatively with one another by way of selecting the appropriate kernels for execution. For example, compute tile 302-3 may execute a write cascade kernel that writes data to a cascade connection to send data to compute tile 302-6. Compute tile 302-6 may execute a read cascade kernel that reads data from a cascade connection to receive data from compute tile 302-3 and so forth.

Referring again to the example of FIG. 9, a write cascade kernel executed by compute tile 302-2 may calculate ($A_{00} \times B_{00}$) and write the result to a cascade connection. A read cascade kernel executed by compute tile 302-1 is capable of reading the result from the incoming cascade connection, calculating ($A_{01} \times B_{10}$), and summing the results.

Figure 10A:
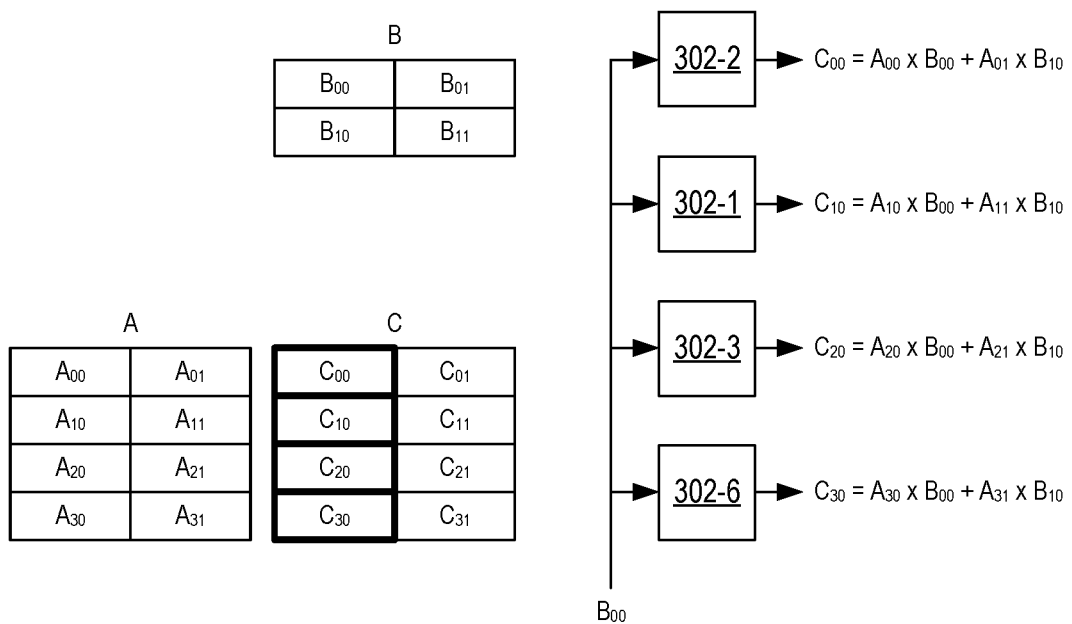
FIGS. 10A, 10B, and 10C illustrate certain operative features of example overlays.
Figure 10B:
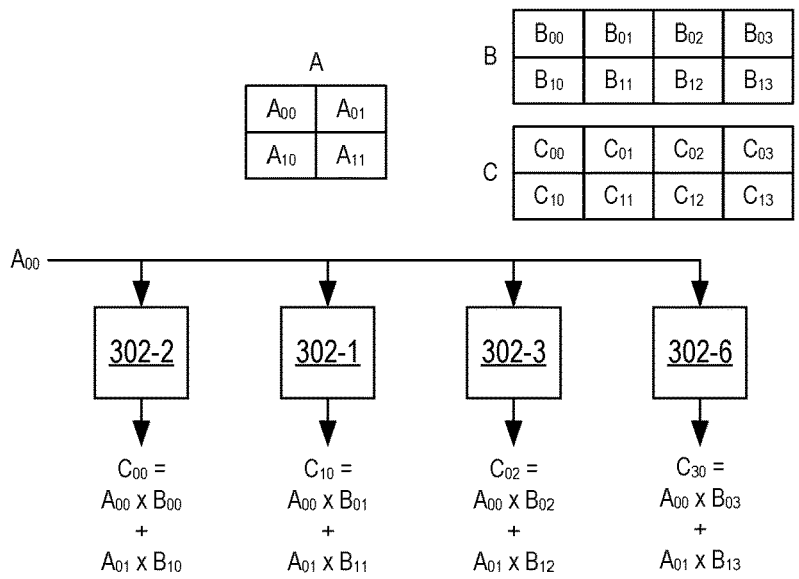
Figure 10C:
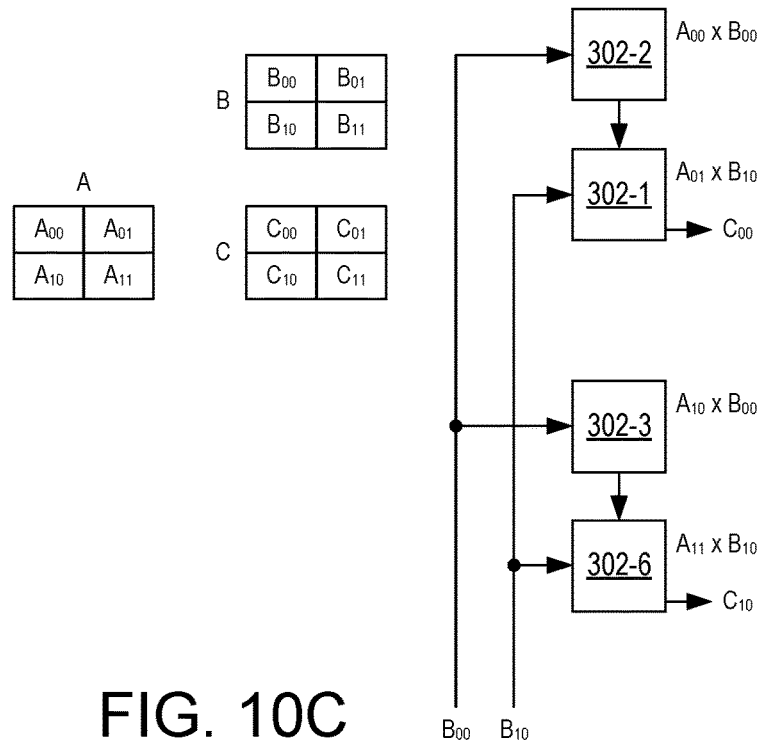

FIGS. 10A, 10B, and 10C illustrate certain operative features of example overlays. FIGS. 10A, 10B, and 10C illustrate examples of logical connectivity implemented by different overlays. In the examples of FIGS. 10A, 10B, and 10C, the A terms represent feature maps while the B terms represent weights. The C terms represent the output data items that are generated by operation of the compute tiles 302. In the examples of FIGS. 10A, 10B, and 10C, the overlays are implemented using 4 compute tiles 302. For example, a partition used to implement an application includes 4 compute tiles.

FIG. 10A illustrates an example implementation of an overlay and corresponding mode of data movement. In the example of FIG. 10A, the overlay illustrated is characterized by the broadcasting of weights. The term "broadcast" refers to conveying a same data item over a selected (e.g., single) channel to multiple, different endpoints or destinations. In the example, weights are broadcast to each of the 4 compute tiles 302 over a single stream channel. As shown, the weight $B_{00}$ is initially broadcast to each compute tile 302. The weight is used as part of a matrix multiply operation with a feature map (A) also provided to the compute tile. The stream channels over which the feature maps are provided are not illustrated. Appreciably, since each of the compute tiles 302 illustrated in FIG. 10A receives a different feature map, 4 stream channels are needed to convey the feature maps (e.g., one stream channel to each of the compute tiles 302 illustrated). No cascade connections are utilized between compute tiles 302 in the example of FIG. 10A.

In this example, each compute tile 302 receives a same weight and a different feature map. For example, compute tile 302-2 initially receives $A_{00}$ and $B_{00}$; compute tile 302-1 initially receives $A_{10}$ and $B_{00}$; compute tile 302-3 initially receives $A_{20}$ and $B_{00}$; and compute tile 302-6 initially receives $A_{30}$ and $B_{00}$. Each of compute tiles 302 performs a matrix multiply operation. Subsequently, weight $B_{10}$ is broadcast to each of the 4 compute tiles. Compute tile 302-2 receives $A_{01}$ and $B_{10}$; compute tile 302-1 receives $A_{11}$ and $B_{10}$; compute tile 302-3 receives $A_{21}$ and $B_{10}$; and compute tile 302-6 receives $A_{31}$ and $B_{10}$ Each compute tile 302 then performs a matrix multiply operation. Each compute tile 302 is capable of summing the results of the two matrix multiply operations and outputting the sum.

FIG. 10B illustrates another example implementation of an overlay and corresponding mode of data movement. In the example of FIG. 10B, the overlay illustrated is characterized by the broadcasting of feature maps. Feature maps are broadcast to each of the 4 compute tiles 302. The feature maps may be broadcast over a single stream channel. As shown, the feature map $A_{00}$ is initially broadcast to each compute tile 302. The feature map is used as part of a matrix multiply operation with a weight also provided to the compute tile. The stream channels over which the weights are provided are not illustrated. Appreciably, since each of the compute tiles 302 illustrated in FIG. 10B receives a different weight, 4 stream channels are needed to convey the weights (e.g., one to each of the compute tiles 302 illustrated). In this example, each compute tile 302 receives a same feature map and a different weight. For example, compute tile 302-2 initially receives $A_{00}$ and $B_{00}$; compute tile 302-1 initially receives $A_{00}$ and $B_{01}$; compute tile 302-3 initially receives $A_{00}$ and $B_{02}$; and compute tile 302-6 initially receives $A_{00}$ and $B_{03}$. Each of the compute tiles 302 performs a matrix multiply operation. Subsequently, compute tile 302-2 receives $A_{01}$ and $B_{10}$; compute tile 302-1 receives $A_{01}$ and $B_{11}$; compute tile 302-3 receives $A_{01}$ and $B_{12}$; and compute tile 302-6 receives $A_{01}$ and $B_{13}$. Each compute tile 302 is capable of performing a matrix multiply operation. Each compute tile 302 is capable of summing the results of the two matrix multiply operations and outputting the sum.

FIG. 10C illustrates another example implementation of an overlay and corresponding mode of data movement. In the example of FIG. 10C, the overlay illustrated is characterized by the broadcasting of multiple weights. A first weight is broadcast over one stream channel to 2 different compute tiles. A second weight is broadcast over one stream channel to 2 different compute tiles. A first stream channel broadcasts weight $B_{00}$ to compute tiles 302-2 and 302-3, while a second and different stream channel concurrently broadcasts weight $B_{10}$ to compute tiles 302-1 and 302-6. In this example, two compute tiles 302 are used to perform the two matrix multiply operations and summation, thereby resulting in usage of a larger number of compute tiles with faster operation (higher throughput).

In the example of FIG. 10C, compute tile 302-2 performs a matrix multiply operation of $A_{00} \times B_{00}$. The result is passed to compute tile 302-1 via a cascade connection. Compute tile 302-1 performs a matrix multiply operation of $A_{01}$ and $B_{10}$. Compute tile 302-1 sums the two matrix multiply results and outputs the resulting sum. Compute tile 302-3 performs a matrix multiply operation of $A_{10} \times B_{00}$. The result is passed to compute tile 302-6 via a cascade connection. Compute tile 302-6 performs a matrix multiply operation of $A_{11}$ and $B_{10}$. Compute tile 302-6 sums the two matrix multiply results and outputs the resulting sum.

The examples of FIGS. 10A, 10B, and 10C illustrate how different overlays may implement different modes of data movement for a given application implemented in a partition of DP array 102. For example, in the examples of FIGS. 10A and 10B, the compute tiles each generate an element of the resulting C matrix. In the example of FIG. 10C, two compute tiles are used to compute one element of the resulting C matrix. The example of FIG. 10C requires twice the number of compute tiles of the examples of FIGS. 10A and 10B to generate 4 elements of array C, but provides greater data throughput (e.g., greater computational speed in that the element of matrix C may be computed in fewer clock cycles). Each different overlay may be suited to implementing a layer having a particular shape.

FIG. 11 is a table 1100 illustrating attributes of example overlays used to configure an application for a partition of DP array 102. In the example of FIG. 11, each overlay 0, 1, and 2 implements a particular mode of data movement in DP array 102 or in a partition of DP array 102. Each overlay specifies a mode of data movement based on the parameters shown.

In the example, the "Cascade" column indicates whether the overlay utilizes cascade connections. The "IFM Streams" column, where "IFM" stands for "input feature maps," specifies the number of different feature maps sent over the stream channels created by an application to the particular compute tiles 302 implementing the overlay. The feature maps may be sent concurrently. The "W Streams" column specifies the number of different weights that are provided over the stream channels created by an application to the particular compute tiles 302 implementing the overlay. The weights may be sent concurrently.

Accordingly, in the example of FIG. 11, overlay 0 implements a mode of data movement referred to as mode 0. In mode 0, the "IFM Streams" parameter of 4 indicates that 4 different feature maps are conveyed over the stream channels. The "W Streams" parameter of 2 indicates that 2 different weights are conveyed over the stream channels. Mode 0 is a non-cascade mode as indicated by the cascade parameter.

In the example of FIG. 11, overlay 1 implements a mode of data movement referred to as mode 1. In mode 1, the "IFM Streams" parameter of 2 indicates that 2 different feature maps are conveyed over the stream channels. The "W Streams" parameter of 4 indicates that 4 different weights are conveyed over the stream channels. Mode 1 is a non-cascade mode as indicated by the cascade parameter.

In the example of FIG. 11, overlay 2 implements a mode of data movement referred to as mode 2. In mode 2, the "IFM Streams" parameter of 4 indicates that 4 different feature maps are conveyed over the stream channels. The "W Streams" parameter of 4 indicates that 4 different weights are conveyed over the stream channels. Mode 2 is a cascade mode as indicated by the cascade parameter.

Figure 12A:
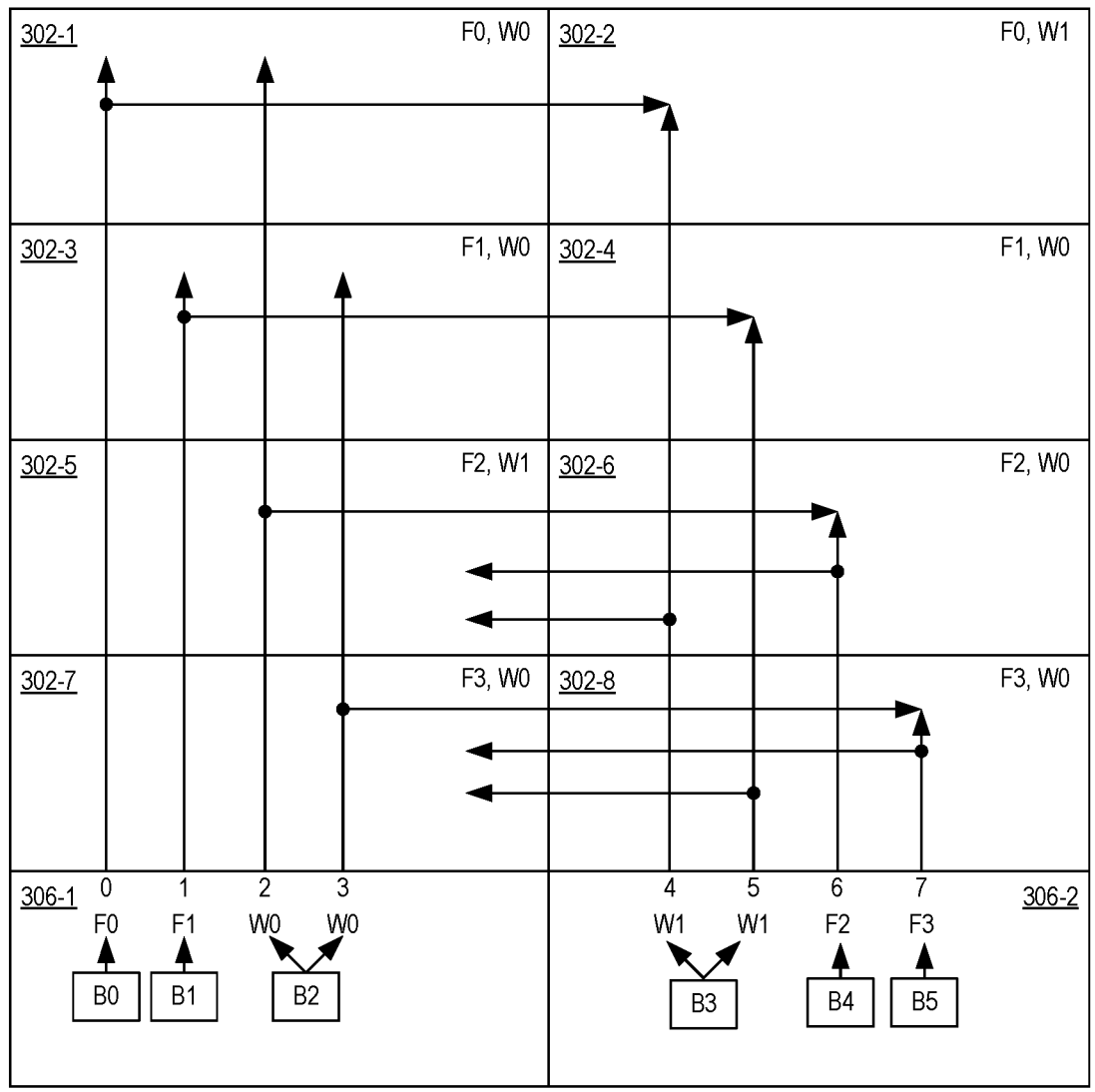
FIGS. 12A, 12B, and 12C illustrate an example of input stream channels implemented by an application with different overlay implementations.

FIG. 12A illustrates an example of the stream channels implemented by an application and the implementation of overlay 0 using the stream channels. In the example of FIG. 12A, the different stream channels used to convey feature maps and weights to compute tiles 302 are depicted as stream channels 0, 1, 2, 3, 4, 5, 6, and 7. In the example, since the stream channels are providing data to compute tiles 302, the stream channels are considered "input" stream channels. Stream channels 0-7 convey feature maps and weights to the respective compute tiles 302. The particular overlay that is implemented defines which stream channels convey which particular weights and which stream channels convey which particular feature maps.

Figure 12B:
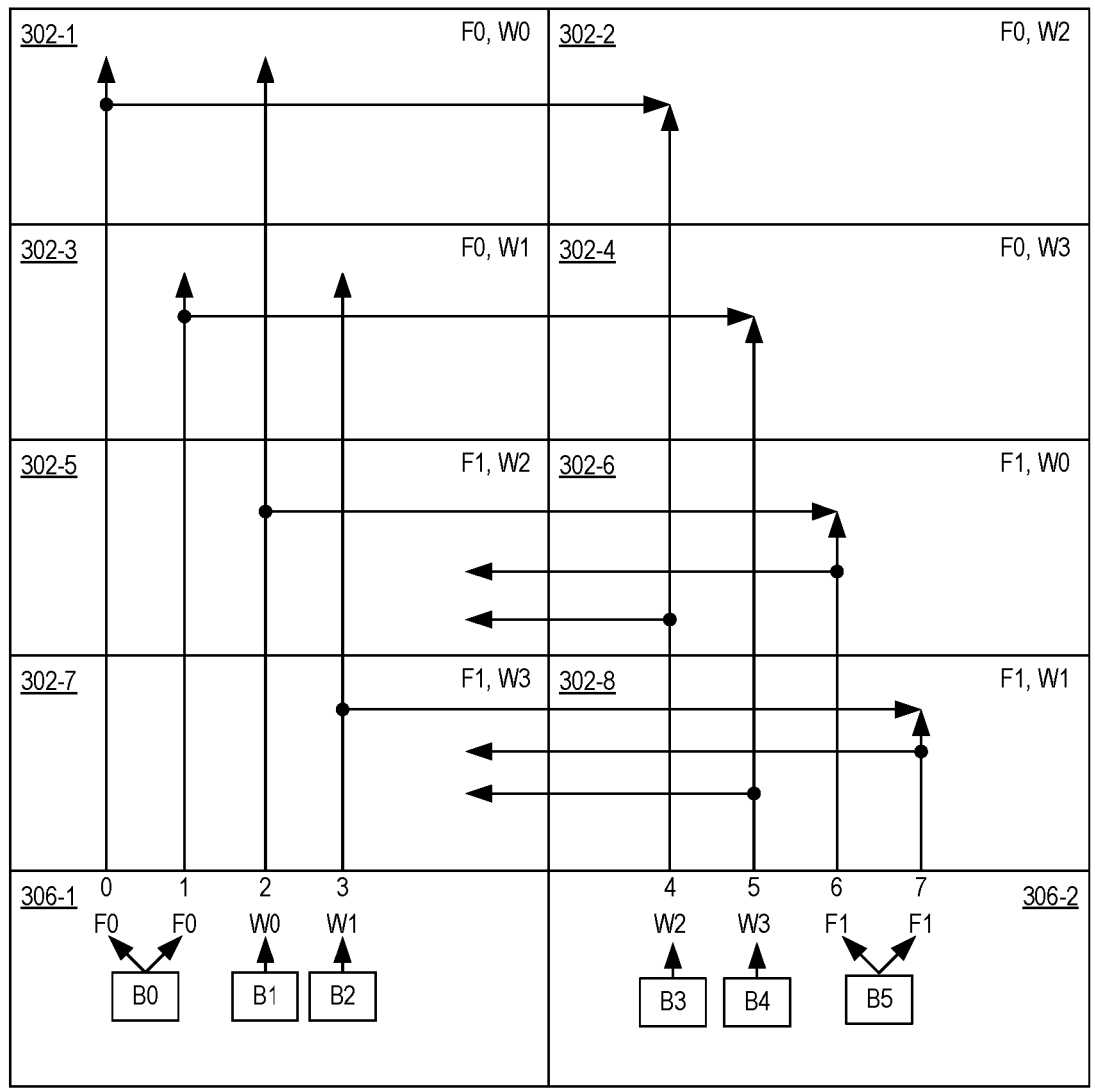
Figure 12C:
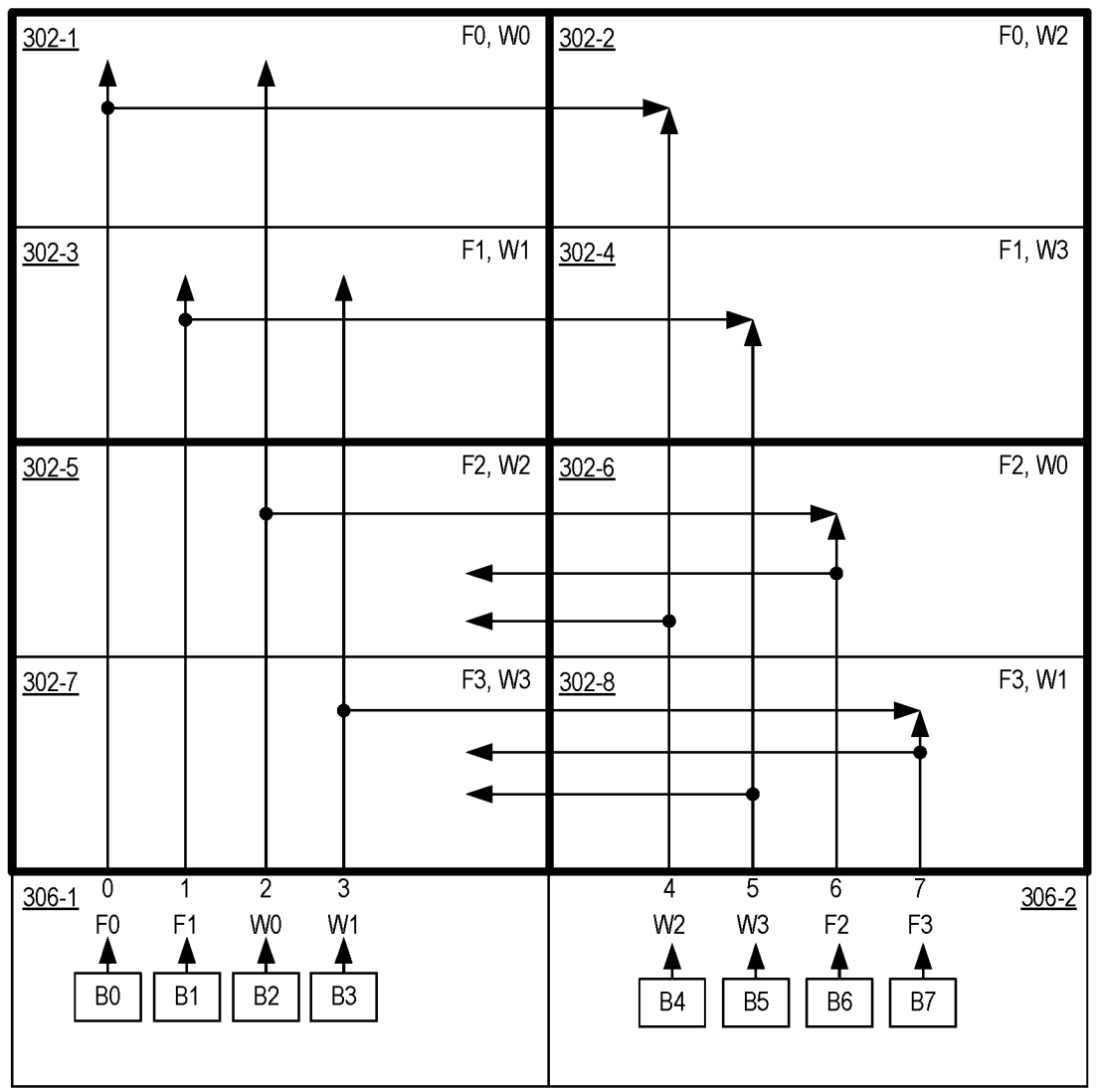

For purposes of illustration and convenience, in FIGS. 12A, 12B, and 12C, the tiles are renumbered. Further, DP array 102, or a partition thereof, includes 8 compute tiles and 2 memory tiles in the examples.

In the example of FIG. 12A, different data items (e.g., feature maps and/or weights) may be provided over the various stream channels 0-7 by feeding the data items to the various stream channels from different buffers located in memory tiles 306. That is, by connecting a particular buffer to a particular stream channel, the stream channel will convey the type of data item contained in that buffer. As discussed, in cases where memory tiles 306 are omitted, data may be fed to stream channels 0-7 from other buffers stored in other memories, whether on-chip memories or off-chip memories.

In the example of FIG. 12A, 4 different feature maps are conveyed with 2 different weights. Each of 4 different stream channels conveys a different feature map (F0, F1, F2, and F3). RAM 504 of memory tile 306-1 includes buffers B0, B1, and B2. RAM 504 of memory tile 306-2 includes buffers B3, B4, and B5. Buffer B0 stores feature map F0. Buffer B1 stores feature map F1. Buffer B2 stores weight W0. Buffer B3 stores weight W1. Buffer B4 stores feature map F2. Buffer B5 stores feature map F3.

In the example of FIG. 12A, buffer 0 feeds stream channel 0. Stream channel 0 is configured to convey feature map F0 to each of compute tiles 302-1 and 302-2. Buffer 1 feeds stream channel 1. Stream channel 1 is configured to broadcast feature map F1 to each of compute tiles 302-3 and 302-4. Stream channel 2 is fed data from buffer B2. Stream channel 2 is configured to broadcast weight W0 to each of compute tiles 302-1 and 302-6. Stream channel 3 is fed data from buffer B2. Stream channel 3 is configured to broadcast weight W0 to each of compute tiles 302-3 and 302-8. Stream channel 4 is fed data from buffer B3. Stream channel 4 is configured convey weight W1 to each of compute tiles 302-2 and 302-5. Stream channel 5 is fed data from buffer B3. Stream channel 5 is configured to broadcast weight W1 to each of compute tiles 302-4 and 302-7. Stream channel 6 is fed data from buffer B4. Stream channel 6 is configured to convey feature map F2 to each of compute tiles 302-6 and 302-5. Stream channel 7 is fed data from buffer B5. Stream channel 7 is configured to convey feature map F3 to each of compute tiles 302-8 and 302-7.

In the example of FIG. 12A, the particular data item, e.g., particular feature map and/or weight, provided to each stream channel depends on the configuration of memory tiles 306 and, more particularly, the particular buffer (B0, B1, B2, B3, B4, and B5) in memory that is used to supply data to each respective stream channel. The overlays dictate the buffer to stream channel pairings by configuring the DMA circuits within the respective tiles (e.g., memory tiles 306 and compute tiles 302 in this example).

Overlay 0 may be implemented in a partition of DP array 102 by array controller 106 programming the DMA circuits of memory tiles 306 with a particular buffer to stream channel mapping. In another aspect, where data is obtained from a memory other than memory tiles 306, DMA circuits of other tiles such as interface tiles 304 that access the other memories to provide data to compute tiles 302 may be programmed with a particular buffer to stream channel mapping. Array controller 106 implements overlay 0 of FIG. 12A, for example, by writing data to the appropriate DMA circuits to create the mapping of buffers to stream channels shown. Further, the buffers B0-B5 may be moved into memory tiles 306 from other memories by way of array controller 106 programming the DMA circuits of the interface tiles 304 and/or memory tiles 306 to move such data to implement a layer (e.g., the overlay) of the application.

The particular kernel(s) and/or function(s) thereof that is executed in the respective processors 420 of each compute tile 302 provides the executable instructions necessary to correctly process the data received via the different stream channels. Though the data provided over the stream channels may change from one overlay to another, so too may the particular kernel(s) and/or function(s) executed in the various compute tiles 302 based on the configuration of such kernel(s) by providing appropriate runtime parameters 212 to the respective compute tiles for each overlay that is implemented. The runtime parameters 212 provided to each compute tile 302 ensure that the kernel(s) executed by the processor 420 therein interprets and applies the received data correctly in performing any computations for the particular layer being implemented based on the corresponding overlay that is used.

In one or more other example implementations, each overlay may select the kernels to be executed in the respective compute tiles and runtime parameters 212 may configure such kernels.

Figure 13:
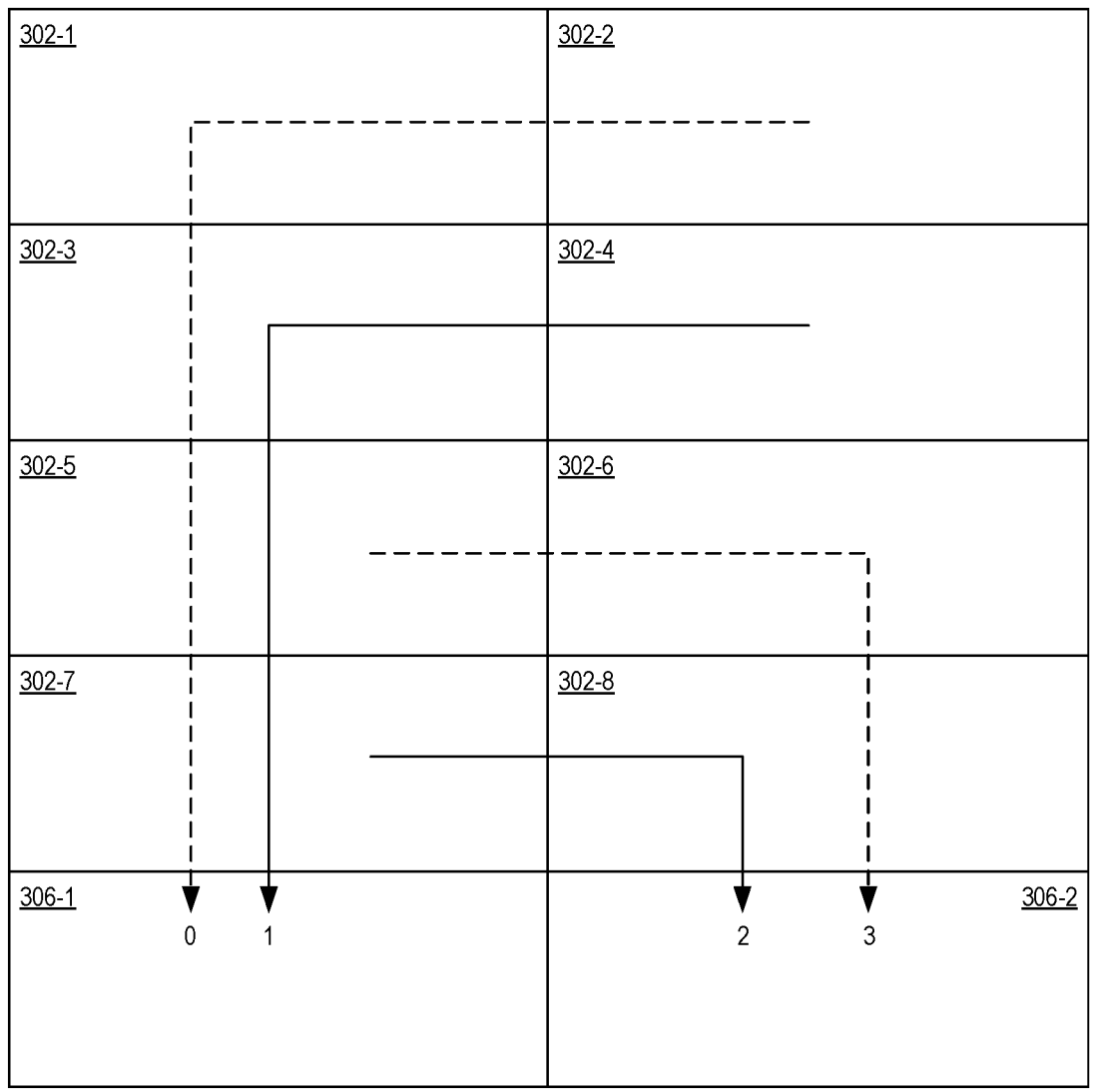
FIG. 13 illustrates an example of output stream channels implemented by an application.

In the example of FIG. 12A, each compute tile 302 outputs a result via the output stream channels illustrated in FIG. 13. One or more of the compute tiles 302 may also be configured to execute an activation kernel subsequent to execution of the non-cascade kernel.

FIG. 12B illustrates an example of the stream channels implemented by an application and the implementation of overlay 1 using the stream channels. The stream channels illustrated in FIG. 12B are input stream channels. In the example of FIG. 12B, the stream channels 0-7 are the same as described in connection with FIG. 12A. That is, FIGS. 12A and 12B illustrate stream channels implemented by a same application and may remain in place as different overlays are implemented. Accordingly, in the example of FIG. 12B, each stream channels 0-7 provide data to the same compute tiles 302 as in the example of FIG. 12A.

In the example of FIG. 12B, different data items (e.g., feature maps and/or weights) may be provided over the various stream channels 0-7 by feeding the data items to the various stream channels from different buffers located in memory tiles 306. That is, by connecting a particular buffer to a particular stream channel, the stream channel will convey the type of data item contained in that buffer. As discussed, in cases where memory tiles 306 are omitted, data may be fed to stream channels 0-7 from other buffers stored in other memories, whether on-chip memories or off-chip memories.

In the example of FIG. 12B, 2 different feature maps are conveyed with 4 different weights. RAM 504 of memory tile 306-1 includes buffers B0, B1, and B2. RAM 504 of memory tile 306-2 includes buffers B3, B4, and B5. Buffer B0 stores feature map F0. Buffer B1 stores weight W0. Buffer B2 store weight W1. Buffer B3 stores weight W2. Buffer B4 stores weight W3. Buffer B5 stores feature map F1.

In the example of FIG. 12B, 4 stream channels are used to convey feature maps. A first pair of 2 of the 4 stream channels convey the same feature map (e.g., F0). A second pair of 2 of the 4 stream channels convey the same feature map (e.g., F1), but a feature map that differs from the feature map conveyed by the first pair of stream channels. Four stream channels are used to convey 4 different weights.

In the example of FIG. 12B, buffer 0 feeds stream channels 0 and 1. With stream channels 0 and 1 being fed data from the same buffer, each conveys the same data, which is feature map F0 in this case. Stream channel 0 is configured to broadcast feature map F0 to each of compute tiles 302-1 and 302-2. Stream channel 1 is configured to broadcast feature map F0 to each of compute tiles 302-3 and 302-4. Stream channel 2 is fed data from buffer B1. Stream channel 2 is configured to broadcast weight W0 to each of compute tiles 302-1 and 302-6. Stream channel 3 is fed data from buffer B2. Stream channel 3 is configured to broadcast weight W1 to each of compute tiles 302-3 and 302-8. Stream channel 4 is fed data from buffer B3. Stream channel 4 is configured to broadcast weight W2 to each of compute tiles 302-2 and 302-5. Stream channel 5 is fed data from buffer B4. Stream channel 5 is configured to broadcast weight W3 to each of compute tiles 302-4 and 302-7. Stream channel 6 and stream channel 7 are fed data from the same buffer B5. Stream channel 6 is configured to broadcast feature map F1 to each of compute tiles 302-6 and 302-5. Stream channel 7 is configured to broadcast feature map F1 to each of compute tiles 302-8 and 302-7.

In the example of FIG. 12B, feature maps F0 and F1 and weights W0, W1, W2, and W3 are provided to compute tiles 302 from memory tiles 306. The particular data item, e.g., particular feature map and/or weight, provided to each stream channel depends on the configuration of memory tile 306 and, more particularly, the particular buffer (B0, B1, B2, B3, B4, and B5) in memory that is used to supply data to each respective stream channel. The overlays dictate the buffer to stream channel pairings by configuring the DMA circuits within the respective tiles (e.g., memory tiles 306 in this example).

Overlay 1 may be implemented in a partition of DP array 102 by array controller 106 programming the DMA circuits of memory tiles 306 with a particular buffer to stream channel mapping. In another aspect, where data is obtained from a memory other than memory tiles 306, DMA circuits of other tiles such as interface tiles 304 that access the other memories to provide data to compute tiles 302 may be programmed with a particular buffer to stream channel mapping. Array controller 106 implements overlay 1 of FIG. 10B, for example, by writing data to the appropriate DMA circuits to create the mapping of buffers to stream channels shown and to move data to create the buffers within the memory tiles 306 as illustrated.

The particular kernel(s) and/or function(s) thereof that is executed in the respective processors 420 of each compute tile 302 provides the executable instructions necessary to correctly process the data received via the different stream channels. Though the data provided over the stream channels may change from one overlay to another, so too may the particular kernel(s) and/or function(s) executed in the various compute tiles 302 based on the configuration of such kernel(s) by providing appropriate runtime parameters 212 to the respective compute tiles for each overlay that is implemented. The runtime parameters 212 provided to each compute tile 302 ensure that the kernel(s) executed by the processor 420 therein interprets and applies the received data correctly in performing any computations for the particular layer being implemented based on the corresponding overlay that is used.

In one or more other example implementations, each overlay may select the kernels to be executed in the respective compute tiles and runtime parameters 212 may configure such kernels.

In the example of FIG. 12B, each compute tile 302 outputs a result via the output stream channels illustrated in FIG. 13. One or more of the compute tiles 302 may also be configured to execute an activation kernel subsequent to execution of the non-cascade kernel.

FIG. 12C illustrates an example of the stream channels implemented by an application and the implementation of overlay 2 using the stream channels. The stream channels illustrated in FIG. 12C are input stream channels. In the example of FIG. 12C, the stream channels 0-7 are the same as described in connection with FIGS. 12A and 12B. That is, FIGS. 12A, 12B, and 12C illustrate stream channels implemented by a same application and may remain in place as different overlays are implemented. Accordingly, in the example of FIG. 12C, each stream channel 0-7 provides data to the same compute tiles 302 as in the example of FIG. 12B.

In the example of FIG. 12C, 4 different feature maps are conveyed with 4 different weights. RAM 504 of memory tile 306-1 includes buffers B0, B1, B2, and B3. RAM 504 of memory tile 306-2 includes buffers B4, B5, B6, and B7. Buffer B0 stores feature map F0. Buffer B1 stores feature map F1. Buffer B2 stores weight W0. Buffer B3 stores weight W1. Buffer B4 stores weight W2. Buffer B5 stores weight W3. Buffer B6 stores feature map F2. Buffer B7 stores feature map F3.

As noted, overlay 2 is a cascade overlay implementing a cascade mode. In the example of FIG. 12C, selected processors 420 of compute tiles 302 are connected, e.g., configured to communicate, using cascade connections. In the cascade mode, the cascade connections, e.g., at least selected ones of the cascade connections, are enabled. That is, enabled ones of the cascade connections are able to pass data. Though the example of FIG. 12C utilizes vertical cascade connections (e.g., cascade connections between processors in a same column), it should be appreciated that cascade connections may run horizontally (row-wise) and/or vertically (column-wise) in accordance with the particular DP array architecture and overlay that is implemented.

An example in which cascade connections are enabled is by the processor 420 of a compute tile 302 executing a kernel and/or function that is configured, by way of runtime parameters 212, to write data to an outgoing cascade connection and another kernel and/or function in another processor 420 coupled to the same cascade connection configured, by way of runtime parameters 212, to read data from an incoming cascade connection. In the example of FIG. 12C, the cascade connected pairs of compute tiles are compute tiles (302-1 and 302-3); (302-2 and 302-4); (302-5 and 302-7); and (302-6 and 302-8).

In the example of FIG. 12C, being configured to implement overlay 2 for the application, each of stream channels 0-7 is fed data from a different buffer stored in memory tiles 306. In the example of FIG. 12C, each of stream channels 0-7 is fed data from a respective one of buffers B1, B2, B3, B4, B5, B6, and B7. In the example of FIG. 12C, 4 stream channels are used to convey 4 different feature maps and 4 stream channels are used to convey 4 different weights.

In consequence, stream channel 0 is configured to broadcast feature map F0 to each of compute tiles 302-1 and 302-2. Stream channel 1 is configured to broadcast feature map F1 to each of compute tiles 302-3 and 302-4. Stream channel 2 is configured to broadcast weight W0 to each of compute tiles 302-1 and 302-6. Stream channel 3 is configured to broadcast weight W1 to each of compute tiles 302-3 and 302-8. Stream channel 4 is configured to broadcast weight W2 to each of compute tiles 302-2 and 302-5. Stream channel 5 is configured to broadcast weight W3 to each of compute tiles 302-4 and 302-7. Stream channel 6 is configured to broadcast feature map F2 to each of compute tiles 302-5 and 302-6. Stream channel 7 is configured to broadcast feature map F3 to each of compute tiles 302-7 and 302-8.

Overlay 2 may be implemented in a partition of DP array 102 by array controller 106 programming the DMA circuits of memory tiles 306 with a particular buffer to stream channel mapping. In another aspect, where data is obtained from a memory other than memory tiles 306, DMA circuits of other tiles such as interface tiles 304 that access the other memories to provide data to compute tiles 302 may be programmed with a particular buffer to stream channel mapping. Array controller 106 implements overlay 2 of FIG. 12C, for example, by writing data to the appropriate DMA circuits to create the mapping of buffers to stream channels and creates the buffers illustrated in the example of FIG. 12C.

The particular kernel(s) and/or function(s) thereof that is executed in the respective processors 420 of each compute tile 302 provides the executable instructions necessary to correctly process the data received via the different stream channels. Though the data provided over the stream channels may change from one overlay to another, so too may the particular kernel(s) and/or function(s) executed in the various compute tiles 302 based on the configuration of such kernel(s) by providing appropriate runtime parameters 212 to the respective compute tiles for each overlay that is implemented. The runtime parameters 212 provided to each compute tile 302 ensure that the kernel(s) executed by the processor 420 therein interprets and applies the received data correctly in performing any computations for the particular layer being implemented based on the corresponding overlay that is used.

In one or more other example implementations, each overlay may select the kernels to be executed in the respective compute tiles and runtime parameters 212 may configure such kernels.

The examples of FIGS. 12A, 12B, and 12C illustrate that by loading overlays into a partition of a DP array, different data may be distributed throughout tiles of the partition thereby achieving different modes of data movement among the tiles. The different modes of data movement may be achieved at least by virtue of sending different weights and/or feature maps through different ones of the established stream channels. This allows different modes of data movement to be implemented for a same application. That is, for a given application specifying kernels to be executed by compute tiles and particular stream channels, the different modes may be implemented without reconfiguring DP array 102.

FIG. 13 illustrates another example of the stream channels implemented by an application. The example of FIG. 13 illustrates output stream channels for the application. That is, the stream channels illustrated in FIG. 13 may be implemented by the same application referenced in FIGS. 12A, 12B, and 12C to output data from compute tiles 302 of the partition illustrated for the different overlays described.

In the example of FIG. 13, stream channels (e.g., output stream channels) 0, 1, 2, 3, and 4 are implemented. The output stream channels, like the input stream channels previously described, may be implemented by configuring the stream switches of the various tiles included in the partition. In the example, stream channel 0 conveys output data items (e.g., C) generated by compute tiles 302-1 and 302-2 to memory tile 306-1 (or other memory as discussed). Stream channel 1 conveys output data items generated by compute tiles 302-3 and 302-4 to memory tile 306-1. Stream channel 2 conveys output data items generated by compute tiles 302-5 and 302-6 to memory tile 306-2. Stream channel 3 conveys output data items generated by compute tiles 302-7 and 302-8 to memory tile 306-2.

In cases where a cascade overlay is used, the stream channel located at the end (e.g., destination tile) of the set of cascade connected compute tiles 302 may be used. The stream channels indicated with dashed lines (0 and 3), for example, would not be used. Rather, stream channels 1 and 2 would be used to convey the output data items generated by compute tiles 302-3, 302-4, 302-7, and 302-8 to memory tiles 306-1 and 306-2.

In one or more other example implementations, the kernels executing in the compute tiles 302 illustrated in FIG. 13 may be configured using runtime parameters to direct where output data items are directed or written. Kernels may be configured, by way of runtime parameters, to write data to the appropriate addresses (e.g., a particular stream switch or an outgoing cascade interface) for each overlay. For example, while implementing a non-cascade overlay, the kernel executed by compute tile 302-1 directs output to output stream channel 0. The kernel executed by compute tile 302-3 directs output to output stream channel 1. By way of comparison, when implementing a cascade overlay, the kernel executed by compute tile 302-1 directs output to compute tile 302-3 via the cascade connection. The kernel executed by compute tile 302-3 directs output to output stream channel 1.

Within this disclosure, different overlays have been described. It should be appreciated that other overlays may be implemented that use more than 1 cascade connection to link more than 2 compute tiles 302. That is, while the cascade mode illustrated herein is created using computing clusters of 2 compute tiles 302, in other arrangements, computing clusters of 3, 4, or more compute tiles 302 linked by cascade connections may be formed. Further, a partition of DP array 102 may be configured, by way of loading an application and loading overlays sequentially over time corresponding to different layers of the application being executed. This allows the partition to perform the workload for a given layer of the application entirely or in part in an iterative manner where the size of a layer is larger than the partition. It should be appreciated that the dimensions of any matrix multiply operations performed by a partition may vary from those illustrated, particularly from one workload (e.g., overlay/mode) to another.

Figure 14:
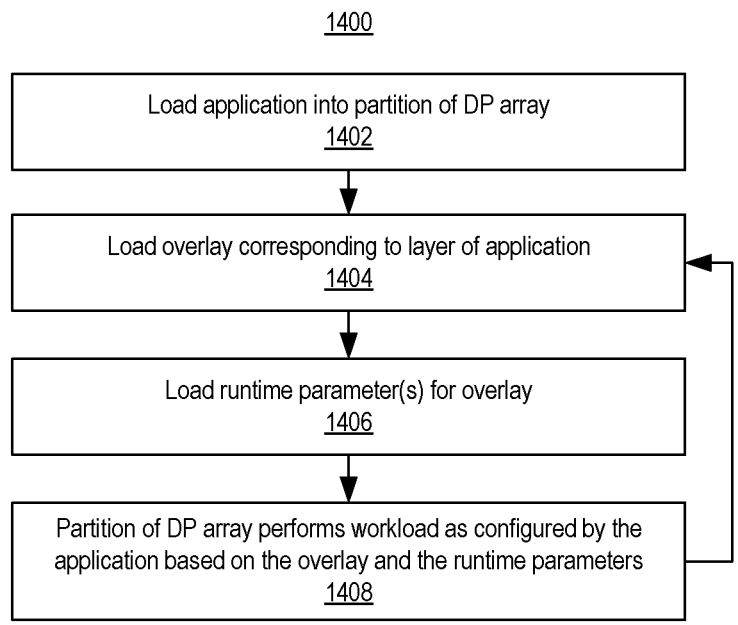
FIG. 14 illustrates an example of a method illustrating certain operative features of the system of FIG. 1.

FIG. 14 illustrates an example of a method 1400 illustrating certain operative features of system 100 of FIG. 1. For purposes of illustration, array controller 106 is capable of performing the operations described in connection with method 1400. It should be appreciated that in other example implementations, a processor may perform the operations attributed to array controller 106. Further, in other example implementations, a processor is capable of providing instructions to array controller 106 for controlling operation of DP array 102.

In the example of FIG. 14, reference is made to a partition of DP array 102. As discussed, a partition may encompass the entirety of DP array 102 or a subset of the tiles of DP array 102. Method 1400 may be performed for either type of partition. Further, an array controller may perform the operations of FIG. 14 for multiple partitions operating concurrently. In other example implementations, the operations described in connection with FIG. 14 may be performed by two or more different array controllers operating concurrently to control different partitions each implementing a different application. Each partition may operate independently of the other regardless of whether the partitions are under control of a same array controller or different array controllers.

In block 1402, array controller 106 loads an application into a partition of DP array 102. The DP array 102 includes a plurality of compute tiles each having a processor. The application specifies kernels executable by the processors and implements stream channels that convey data to the plurality of compute tiles (e.g., input stream channels). The application also implements output stream channels.

For example, loading an application in DP array 102 performs an initial configuration of the partition of DP array 102. In performing block 1402, array controller 106 is capable of loading the executable kernels into the program memories 422 of the compute tiles 302 of the partition, initializing any memory of the partition (e.g., RAMs 404 of compute tiles 302 and/or RAMs 504 of memory tiles 306), and implementing the stream channels by loading configuration data into control registers 414, 514, and/or 614. The loading of the application, which includes initialization data and configuration data, may be performed by array controller 106 writing such data via the memory-mapped network formed of the memory-mapped switches of the tiles.

In block 1404, array controller 106 is capable of loading an overlay corresponding to a layer of the application that is to be executed by the partition of DP array 102.

In one aspect, each overlay specifies a different mapping of buffers to stream channels implemented by the application. Each buffer may include a particular data type (e.g., feature map or weight). Further, each buffer may include a particular element of the data type. In one or more examples, implementing a selected overlay of the plurality of overlays is performed by array controller 106 programming a plurality of DMA circuits to convey data from particular buffers to selected ones of the compute tiles via selected ones of the stream channels.

In another aspect, the mode of data movement of each overlay is characterized by a number of input feature maps and a number of weights conveyed over the stream channels.

In one aspect, sequentially implementing the plurality of overlays includes, for each overlay, programming a plurality of DMA circuits with a different mapping of buffers to the stream channels. As an example, a selected overlay may be implemented in the partition for the application by programming a plurality of DMA circuits to convey data from particular buffers to selected ones of the compute tiles via selected ones of the stream channels.

In another aspect, sequentially implementing the plurality of overlays includes setting up the various buffers that are mapped to the stream channels. Array controller 106 is capable of moving data, by programming the DMA circuits of interface tiles 304 and/or memory tiles 306, for example, to create the various buffers mapped to the stream channels to include the correct data.

In one aspect, the application implements a neural-network. Each layer of the neural-network is mapped to one of the plurality of overlays. Different ones of the plurality of overlays are loaded over time to implement respective layers of the neural-network.

In one example, array controller 106 is capable of executing a control application specifying a schedule stored in memory. The schedule specifies workloads to be executed by the application as implemented in the partition. The workloads may be generated by compiler 204. The schedule may specify which overlays are to be loaded as part of a sequence of overlays to be loaded for the application to perform the sequence of workloads (e.g., to implement the layers of the application and perform a workload for each layer). In another aspect, another processor such as a host processor may instruct array controller 106 to initiate loading of a particular overlay in the partition of the DP array 102. In that case, the other processor dictates the schedule or sequence of overlays to be implemented in DP array 102 by array controller 106.

In block 1406, array controller 106 loads runtime parameters into the partition for the overlay loaded in block 1404. Each layer of the application may be associated with a set of runtime parameters. The runtime parameters may be compute tile specific. The runtime parameters configure the various kernels for execution. Accordingly, in block 1406, array controller 106 selects the runtime parameters for the layer being implemented by the overlay loaded into the partition in block 1404 and loads the runtime parameters into RAMs 404 of compute tiles 302. The runtime parameters that are loaded may be for one or more selected compute tiles or all compute tiles of the partition of DP array 102.

In one aspect, array controller 106 is capable of, for a selected overlay of the plurality of overlays, providing a runtime parameter to a selected compute tile of the plurality of compute tiles. The runtime parameter configures an operational parameter of a kernel executed by the selected compute tile. For example, the runtime parameter is used by a processor of the selected compute tile in executing the kernel stored therein to change an operational feature of the selected compute tile. It should be appreciated, however, that the runtime parameters that are loaded may be for one or more selected compute tiles or all compute tiles of the partition of DP array 102.

In one aspect, a runtime parameter for a selected compute tile is capable of changing the execution flow of the kernel executed by the selected compute tile. For example, the kernel may be configured to read values from the runtime parameters and, based on the values read, selectively execute particular functions (e.g., execute particular functions and/or skip execution of particular functions). Thus, as different runtime parameters are loaded into the partition of the DP array during runtime for different layers, functionality and/or runtime behavior of kernels of the application may be modified.

This allows each kernel to execute different operations based on the particular runtime parameter values read for the different layers being implemented and in accordance with the overlay used for each layer. For example, different layers of the application may utilize different functions such as matrix multiply, convolution, batch normalization, ReLU, other activation functions, or other operations. The runtime parameters loaded for an overlay may specify which of the functions available in the kernel or in different kernels are to be executed on a per compute tile basis for a given overlay. A runtime parameter may cause a kernel to execute an activation function for example or not depending on the value of the runtime parameter.

Accordingly, the particular function(s) executed by each kernel may depend on the runtime parameters loaded into the compute tile and may change from one layer to another based on the particular runtime parameters loaded. Accordingly, for purposes of illustration, the last compute tile 302 in a cascade connected configuration may be instructed to execute an activation function while the other compute tiles 302 in the cascade connected configuration may not.

In one or more examples, the runtime parameter is capable of activating or deactivating a cascade connection between a selected compute tile and at least one other compute tile of the plurality of compute tiles. For example, the runtime parameter may cause the processor of the selected compute tile to provide data to another compute tile by writing to an outgoing cascade connection or receive data from another compute tile by reading from an incoming cascade connection.

In one example, the overlays correspond to particular layers of the application. In that case, for each layer, the runtime parameter specifies one or more dimensions of the particular layer as implemented using the overlay loaded into the partition for that layer. For example, a runtime parameter may specify at least one of a number of rows of a matrix to be processed or a number columns of the matrix to be processed.

In one or more example implementations, a runtime parameter may cause a kernel to read from and/or write to a particular location (e.g., memory) in DP array 102. For example, the runtime parameter may cause the kernel to read from and/or write to a local RAM 404, a particular RAM 404 of an adjacent compute unit, and/or a RAM 504 of a particular memory tile 306.

In another aspect, the runtime parameters may specify or select the particular kernel(s) of a plurality of kernels in the compute tiles to be executed in the respective compute tiles. In other aspects, the overlay may specify the kernel(s) to be executed with the runtime parameters configuring the respective kernels.

In block 1408, the partition of the DP array 102 performs a workload as configured by the application and based on the overlay and the runtime parameters. In response to completing the workload, method 1400 may loop back to block 1404 where array controller 106 is capable of starting the process anew for a different layer of the application.

For example, in one aspect, array controller 106, in implementing a next layer of the application, loads a different overlay into the partition of DP array 102 for that layer. In that case, array controller 106 may continue and load runtime parameters for the different overlay. In another aspect, the overlay to be used for the next layer may be the same overlay used for the prior layer of the application. In that case, array controller 106 may leave the overlay loaded and proceed to block 1406. The runtime parameters may or may not be the same.

Method 1400 illustrates that during runtime of the application, the plurality of overlays are sequentially implemented in the partition of DP array 102. Each overlay implements a different mode of data movement in DP array 102 using the stream channels. As noted, each overlay may be used to implement a particular layer of the application in the partition. For each overlay (e.g., layer) implemented, a workload may be performed by moving data to the plurality of compute tiles based on the respective mode of data movement.

For example, sequentially implementing a plurality of overlays can include implementing a first overlay of the plurality of overlays to perform a first workload including a first matrix multiply operation. A second overlay of the plurality of overlays can be implemented to perform a second workload including a second matrix multiply operation. The first matrix multiply operation and the second matrix multiply operation can be of different dimensions. In one aspect, the linking of a particular buffer to an input stream channel for purposes of conveying data may be configured by the loading of an overlay. That is, while the input stream channels may be established in terms of connectivity to particular tiles, the buffer from which each such input stream channel obtains data to provide to a tile is determined by the overlay that is loaded into DP array 102.

The different layers of the application may be implemented in the partition since different overlays and runtime parameters may be loaded into the partition of DP array 102 without loading a different application into DP array 102 that loads different kernels into the compute tiles or modifies the stream channels.

As discussed, DP array 102 may be subdivided into a plurality of partitions. Each partition may include a subset of the plurality of compute tiles. Each partition is adapted to concurrently implement a different application and sequentially implement a plurality of different overlays specific to the application executed by the partition.

The inventive arrangements described within this disclosure provide efficient and flexible techniques for adapting a DP array to implement different layers of a machine learning or other layered application. Loading an application, as compared to loading an overlay, may be time consuming as the size of the application (e.g., including the kernels and configuration data) is large compared to the size of an overlay and/or runtime parameters. Thus, the application may be loaded at the start and adapted to different workloads through loading of overlays and runtime parameters. Were one to attempt to reconfigure an entire partition of the DP array for each layer (e.g., with a new application for each layer), the DP array would lose significant clock cycles undergoing continued reconfiguration. By separating certain elements, e.g., application from data movement, the DP array may be adapted for different layers of the application without incurring a substantial timing penalty for reconfiguration. Further, the DP array operates in a more computationally efficient manner for each of the respective layers of the application.

In one or more other example implementations, the application loaded into the DP array may cause multiple kernels to be loaded into RAMs 404 of compute tiles. In that case, the runtime parameters may be used to select the particular kernel that is executed for each overlay, wherein each kernel is adapted for the data movement of the overlay that is loaded. As such, the particular kernel selected for execution for a given compute tile 302 may differ from the particular kernel selected for execution for a different compute tile 302.

In one aspect, array controller 106 is capable of providing tasks to task queues of the various DMA circuits 434, 502, 602 to move data into and out from DP array 102. In one example, as each task completes, the DMA circuits are capable of generating a notification that the task has completed thereby allowing array controller 106 to track the progress of the workload as performed by DP array 102.

As discussed, the overlays specify particular input buffers to be used to feed data into the input stream channels that are established in DP array 102 and/or particular output buffers to receive data from the output stream channels. The input and/or output buffers specified may differ from one overlay to another.

Figure 15:
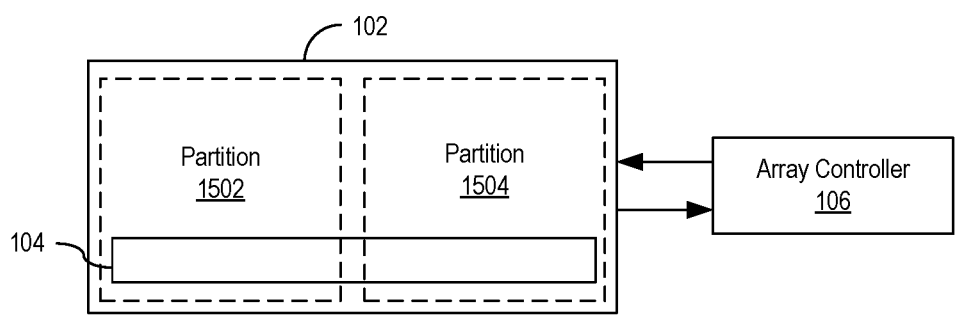
FIG. 15 illustrates an example in which a DP array includes multiple partitions each controlled by an array controller.

FIG. 15 illustrates an example in which DP array 102 includes multiple partitions each controlled by array controller 106. In the example of FIG. 15, DP array 102 is partitioned into a plurality of partitions 1502, 1504. Each partition 1502, 1504 includes one or more compute tiles 302, optionally one or more memory tiles 304 (e.g., if included in DP array 102), and one or more interface tiles 306.

In the example of FIG. 15, a single array controller 106 is capable of controlling operation of multiple partitions. Each of partitions 1502, 1504 is capable of operating independently of the other, though under control of array controller 106. As such, partition 1502 may implement one application while, e.g., concurrently with, partition 1504 implements a different application. Array controller 106 is capable of controlling each partition in terms of loading an application, loading overlays, loading runtime parameters, and initiating workloads for layers of the application.

Figure 16A:
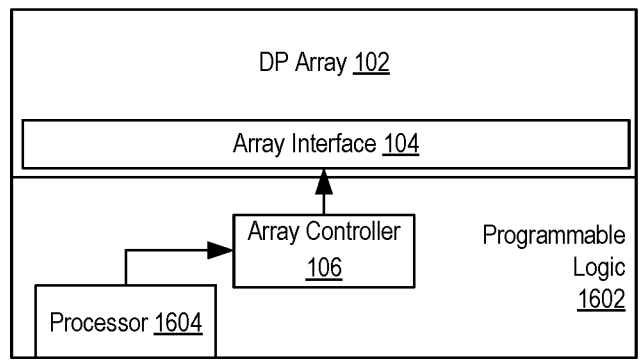
FIGS. 16A, 16B, 16C, 16D, 16E, 16F, 16G, and 16H illustrate different example architectures for an IC including a DP array and one or more array controllers.

FIGS. 16A, 16B, 16C, 16D, 16E, 16F, and 16G illustrate different example architectures for an IC including DP array 102 and array controller 106. In the example of FIG. 16A, the IC includes programmable logic 1602, which is used to implement array controller 106. In one aspect, array controller 106 may be implemented as a state machine circuit. In another example, array controller 106 may be implemented as a soft processor. A soft processor refers to a processor, e.g., a circuit capable of executing program code, that is formed or implemented using programmable logic 1602.

In one or more examples, array controller 106 may execute control application 214 from a memory (not shown) to control operation of DP array 102. In another example implementation, array controller 106 may operate under control of processor 1604. Processor 1604 may be implemented as a hardwired processor.

Figure 16B:
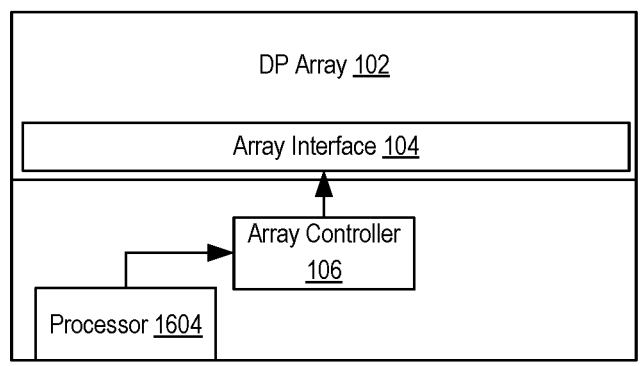

The example of FIG. 16B may operate substantially as described in connection with FIG. 16A with the exception that array controller 106 may be implemented as a hardwired circuit block. In one aspect, array controller 106 may be implemented as a state machine circuit. In another example, array controller 106 may be implemented as a processor capable of executing program code.

Figure 16C:
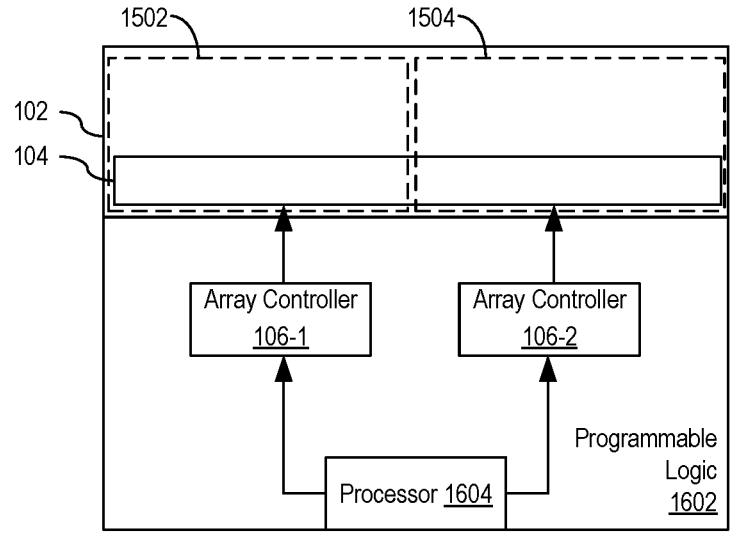

In the example of FIG. 16C, more than one array controller is implemented and shown as array controller 106-1 and array controller 106-2. In one example, both array controllers 106-1 and 106-2 are implemented in programmable logic 1602. In one aspect, array controller 106-1 may be allocated or apportioned a particular subset of tiles of DP array 102, e.g., partition 1502, while array controller 106-2 may be allocated another non-overlapping subset of tiles of DP array 102, e.g., partition 1504. For example, viewing DP array 102 as a grid of columns 1-N, array controller 106-1 may control tiles in columns 1-(M−1), while array controller 106-2 controls tiles in columns M-N, where M and N are integers and M<N. In one aspect, each subset of tiles may be considered a partition that is independent of the other partition. Each partition may implement and execute a different application therein and be controlled completely independently of the other partition. The tiles and stream channels within different partitions in the examples provided herein are isolated from one another.

In one or more examples, each array controller 106-1 and 106-2 of FIG. 16C may execute its own control application 214 from a memory (not shown) to control operation of the respective partitions of DP array 102. In another example implementation, array controllers 106-1 and 106-2 may operate under control of processor 1604. Processor 1604 may be implemented as a hardwired processor or as a soft processor. In either case, processor 1604 may control each of array controllers 106-1 and 106-2 independently to effectuate independent operation of the partitions controlled by each respective array controller. For example, processor 1604 may write the control applications 214 to memories accessible by array controllers 106-1 and 106-2.

Figure 16D:
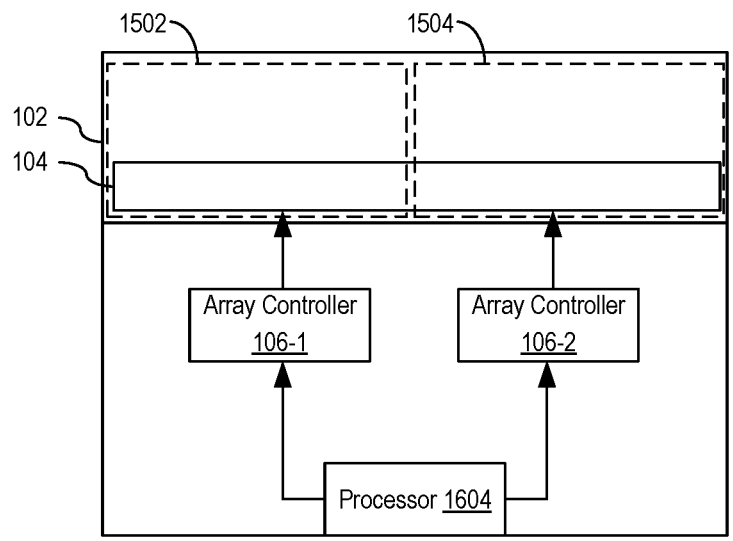

The example of FIG. 16D may operate substantially as described in connection with FIG. 16C with the exception that array controller 106-1 and array controller 106-2 each may be implemented as a hardwired circuit block. The array controllers may be implemented as state machine circuits or as processors capable of executing program code.

In one or more other example implementations, array controller 106-1 of FIGS. 16C and/or 16D may be implemented using programmable logic 1602 (e.g., as a state machine circuit or a soft processor) while array controller 106-2 is implemented as a hardwired circuit block (e.g., an ASIC block) implementing a state machine circuit or a processor.

Figure 16E:
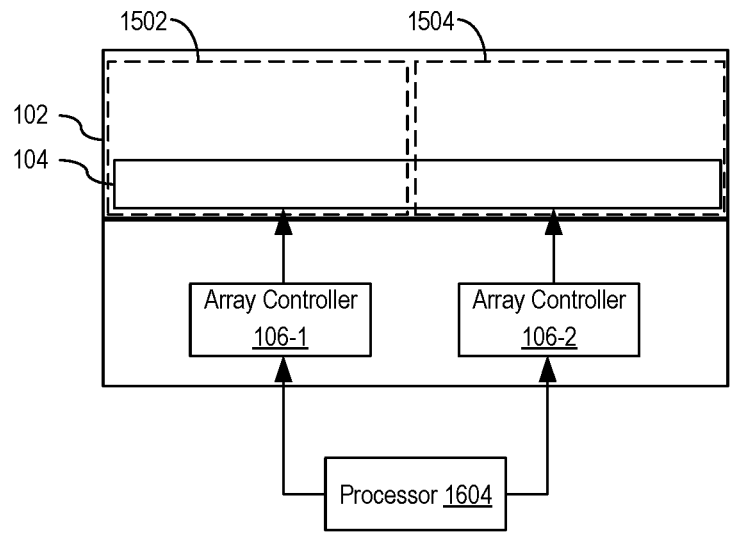

In the example of FIG. 16E, processor 1604 is not implemented or embedded in the IC. For example, processor 1604 may be implemented as an x86 type of processor or another type of processor having another instruction set architecture. Processor 1604 may be disposed in, or part of, another data processing system to which the IC is communicatively linked.

In one or more examples, each array controller 106-1 and 106-2 may execute its own control application 214 from a memory (not shown) to control operation of the respective partitions of DP array 102. In another example implementation, array controllers 106-1 and 106-2 may operate under control of processor 1604. In the various examples described herein, an array controller operating under control of a processor may include the processor 1604 writing the control application 214 executed by the array controller to the memory accessible by array controller 106 for execution.

In the example of FIG. 16E, the IC does not include any programmable logic. Accordingly, array controllers 106-1 and 106-2 may be implemented as hardwired circuit blocks (e.g., ASIC circuit blocks). In the example of FIG. 16E, array controllers 106-1 and/or 106-2 may be implemented as hardwired state machine circuits or hardwired processors.

Figure 16F:
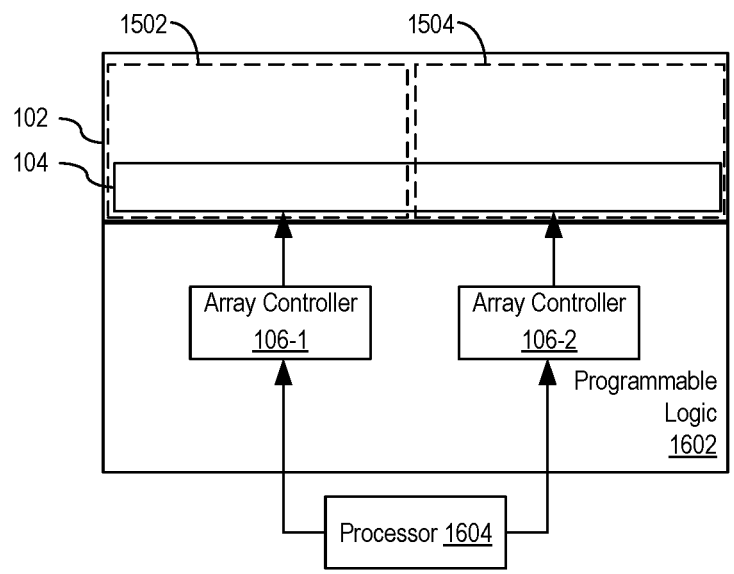

The example of FIG. 16F may operate substantially as described in connection with FIG. 16E with the exception that the IC does include programmable logic 1602. Accordingly, one or both of array controllers 106-1 and/or 106-2 may be implemented using programmable logic whether as a state machine or a soft-processor.

Figure 16G:
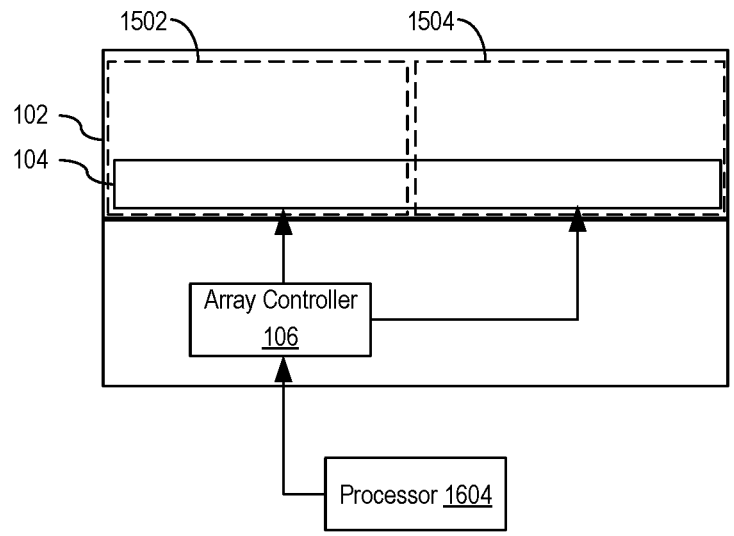

In the example of FIG. 16G, the IC architecture includes a single array controller 106 that is implemented as a hardwired circuit block (e.g., an ASIC block). The array controller 106 may be implemented as a hardwired state machine circuit or a hardwired processor. The single array controller may control more than one partition (e.g., partitions 1502, 1504) of DP array 102 through execution of control application 214.

Figure 16H:
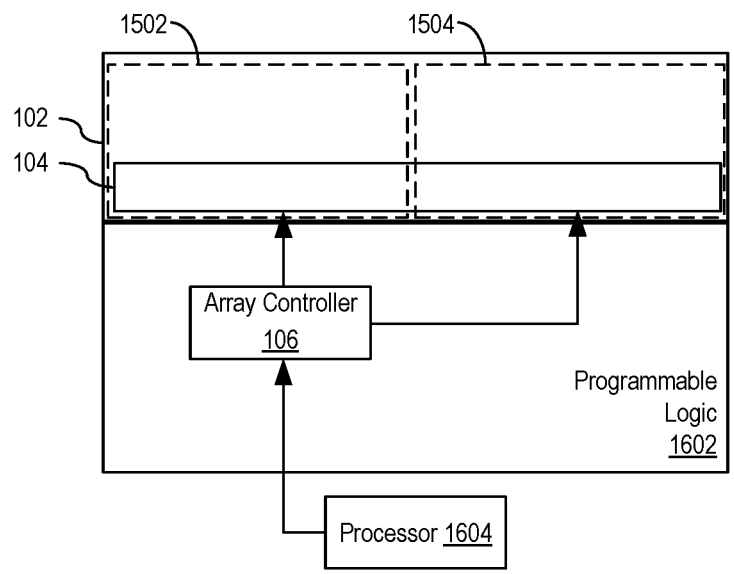

In the example of FIG. 16H, the IC architecture includes programmable logic 1602. In the example of FIG. 16H, the IC includes a single array controller 106 that is implemented using programmable logic 1602. The array controller 106 may be implemented as a state machine circuit or a soft-processor. The single array controller may control more than one partition (e.g., partitions 1502, 1504) of DP array 102 through execution of control application 214.

In the examples of FIGS. 16A, 16B, 16C, 16D, 16E, 16F, 16G, and 16H, the particular number of array controllers 106 shown is provided for purposes of illustration. One, two, or more array controllers 106 may be included in the IC to control DP array 102. In one aspect, the plurality of array controllers 106 correspond on a one-to-one basis with partitions implemented in DP array 102. For example, each array controller 106 may be dedicated for controlling a particular partition of DP array 102. Each array controller 106 may control the loading of applications, loading of overlays and runtime parameters, and initiation of workloads for their respective partitions of DP array 102. In other examples, the array controller to partition ratio need not be one-to-one.

In initiating the workloads, array controller 106 is capable of providing pointers (e.g., memory addresses) to the partition of DP array 102 being controlled to specify input data (e.g., feature maps and weights) to be processed from buffers. Each array controller 106 further can provide control information. In one aspect, array controllers 106 are capable of writing tasks to the various DMA circuits of tiles within their respective partitions. For purposes of illustration, the tasks may specify buffer descriptors, pointers, and/or control data. The tasks may, for example, cause DMA circuits to move data to create buffers, program the DMA circuits to map particular buffers to particular stream channels, and/or specify pointers to data to provide data items to the compute tiles 302. Each DMA circuit, for example, may include one or more task queues. Array controllers 106 may write tasks to these task queues as part of executing control application 214. As an illustrative and non-limiting example, array controllers 106 are capable of writing tasks, e.g., programming, DMA circuits via the various communication mechanisms described herein (e.g. memory-mapped switches and/or stream switches, via direct connections, and/or via connections to interfaces 604 of interface tiles 304) to effectuate movement of data. For example, array controllers 106 may implement overlays by writing buffer descriptors or other data to the DMA circuits.

For purposes of illustration, referring to the example of FIG. 10B, array controller 106 may create buffers in memory tile 306. Array controller 106 may provide a pointer specifying an address for $A_{00}$ to a DMA circuit of a memory tile 306 so that the DMA circuit transfers $A_{00}$ via a stream channel to compute tile 302-2. Similarly, array controller 106 is capable of providing another pointer specifying an address for $A_{01}$ to the DMA circuit of the memory tile 306 so that the DMA circuit transfers $A_{01}$ via a stream channel to compute tile 302-2. Array controller 106 is capable of continually providing pointers to convey the various data items illustrated so that the partition may perform the workload for each given layer using the correct sequence of operations based on the overlay that is used.

In performing the functionality described herein, controllers 106 alleviate the workload imposed on other processors whether embedded in the IC itself or implemented external to the IC and located within a host data processing system. Though the size of DP array 102 is relatively small in the example figures disclosed herein for purposes of illustration, DP array 102 may include hundreds of tiles in various configurations. Thus, the number of data transfers and data movement operations required to keep DP array 102 operating at or near full capacity may be significant. Inclusion of one or more array controllers 106 frees up significant processing resources (e.g., clock cycles) of other processors. Further, including such controllers on the same IC as DP array 102 facilitates more efficient operation and greater data throughput.

In one or more example implementations, array controller (s) 106 are capable of controlling operation of compute tiles 302, interface tiles 304, and memory tiles 306. In some arrangements, array controller(s) 106 may not control operation of compute tiles 302. For example, compute tiles 302 may operate under control of the kernels executed by the respective processors 420 of compute tiles 302. As noted, runtime parameters provided by compute tiles 302 may vary the functionality of kernels. In one or more other example implementations, array controller(s) 106 may control operation of compute tiles 302, interface tiles 304, and memory tiles 306.

Figure 17:
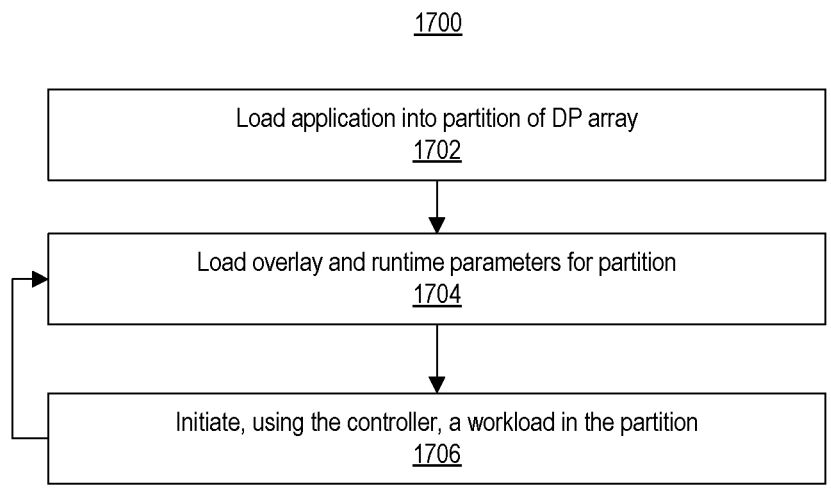
FIG. 17 illustrates an example method of operation of an IC including a DP array and an array controller.

FIG. 17 illustrates an example method 1700 of operation of an IC including a DP array 102. Method 1700 illustrates various operations performed by array controller 106 to execute workloads using DP array 102.

In block 1702, array controller 106 loads an application into a partition of DP array 102. The application includes a plurality of kernels that are executable by the compute tiles 302. More particularly, the kernels are executable by the processors 420 of the compute tiles 302. As discussed, the application loads kernels into compute tiles of the partition, initializes memories of the partition, and implements stream channels (e.g., input and output stream channels) for conveying data to the compute tiles and outputting data form the compute tiles.

In block 1704, the array controller 106 loads an overlay to implement a layer of the application in the partition. The array controller 106 also loads runtime parameters for the layer.

In block 1706, array controller 106 initiates a workload in the partition configured by the application, the overlay, and the runtime parameters. Array controller 106 is capable of initiating the workload by writing tasks to the DMA circuits of the tiles. The tasks, as specified by the control application, sequence the layers and the operations necessary to implement each layer. The tasks may move data to create buffers. The tasks may specify addresses of data, e.g., feature maps and weights, as contained in the buffers, to convey the data to the compute tiles over respective ones of the stream channels. The tasks may specify pointers to output buffers to be used in writing data generated by the compute tiles.

In one or more example implementations, instructions executed by array controller 106 may be pre-generated by compiler 204. The instructions may be embodied as the control application 214 including mapping 210 and runtime parameters 212 and specifying the schedule described herein. Array controller 106 is capable of executing the instructions at runtime to execute the application and perform the various operations described herein.

In another aspect, the schedule of the control application 214 specifies the number of times that each partition, in implementing an application as programmed with an overlay and runtime parameters, is to iterate to complete a given layer. That is, in some cases, a partition may be able to implement an entire layer of the application without having to perform loops. In other cases, the layer is broken out into sections where the partition iterates a number of times (e.g., corresponding to the number of sections) to complete the workload of a layer. It should be appreciated that the control application, as generated by the compiler 204, controls this aspect of operation of each partition for the different layers of the application being executed.

After block 1706, method 1700 can loop back to block 1704 to continue processing further workloads. As such, the array controller is capable of controlling the loading of applications, overlays, runtime parameters into the partition and sequence workloads by providing pointers and/or control information to the DP array 102.

In one or more other example implementations, where DP array 102 is partitioned into a plurality of partitions and includes a plurality of controllers 106, each controller may be dedicated to controlling a particular partition of DP array 102. In such cases, each controller is capable of independently controlling a partition of DP array 102. For example, each array controller 106 is capable of performing the operations described herein in connection with FIG. 17 with respect to the partition controlled by that array controller. Thus, DP array 102 may implement multiple applications therein independently wherein each application executes in a different partition controlled by a different array controller 106.

Further, each array controller 106 is also capable of performing the operations described herein in connection with FIG. 17 with respect to the partition controlled by that controller. Thus, each partition may implement different overlays over time under control of the particular array controller for that partition. The overlays implemented by each partition will differ based on the application executed by each respective partition. This allows each partition to operate independently and with a dedicated array controller 106 for controlling the loading of applications, overlays, runtime parameters, and sequencing of workloads by providing pointers and/or control information.

Figure 18:
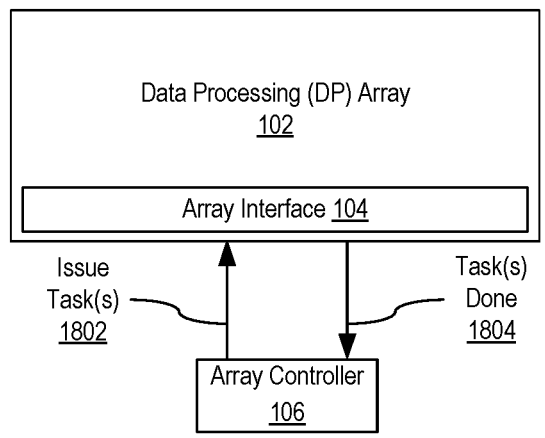
FIG. 18 illustrates additional operative features of an array controller.

FIG. 18 illustrates additional operative features of array controller 106. In the example of FIG. 18, array controller 106 is capable of issuing tasks 1802 to array interface 104. Array controller 106 is further capable of receiving notifications 1804 of when particular tasks performed by compute tiles 302 have completed execution. In one aspect, notifications received by array controller 106 may be received via memory-mapped switches, via stream switches, and/or as interrupts provided through another interface that couples the particular tile or component issuing the interrupt with array controller 106.

In this manner, array controller 106 is capable of continuing to provide tasks to DP array 102 so that DP array 102, or a plurality of partitions in DP array 102, may operate continually without intervention or involvement of a host processor (e.g., from a host computer). As an illustrative and non-limiting example, array controller 106 is capable of initiating data transfers among the DMA circuits of interface tiles 304 and/or memory tiles 306 to provide data to compute tiles 302 and receive data generated by compute tiles 302. Array controller 106 is capable of continuing to store tasks in task queues of DMA circuits so that such DMA circuits may operate continually so long as tasks remain to be processed.

Figure 19:
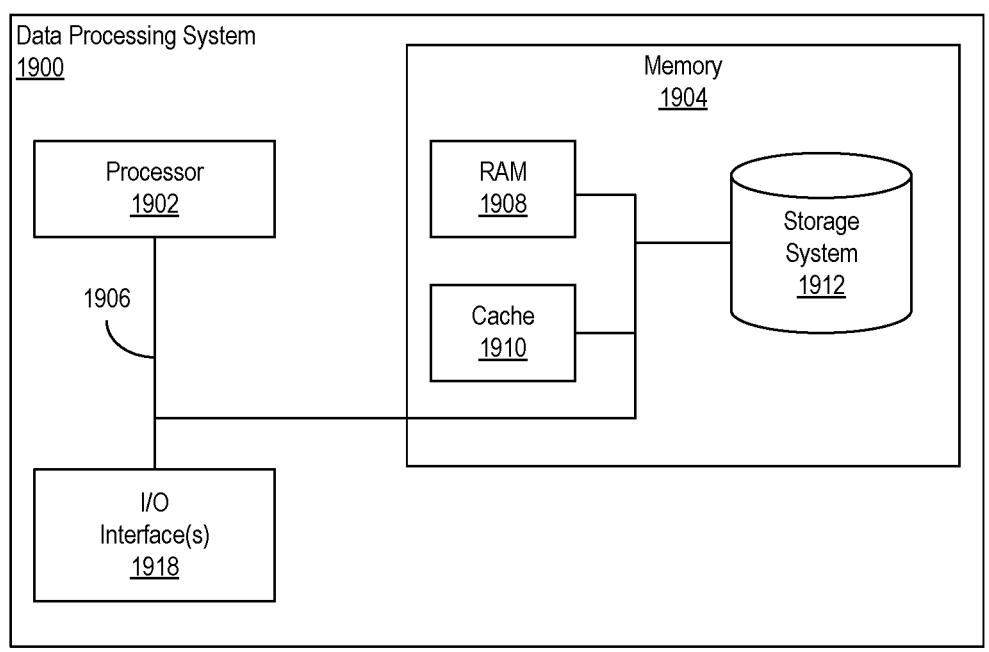
FIG. 19 illustrates an example implementation of a data processing system for use with the inventive arrangements described herein.

FIG. 19 illustrates an example implementation of a data processing system 1900. As defined herein, the term "data processing system" means one or more hardware systems configured to process data, each hardware system including at least one processor and memory, wherein the processor is programmed with computer-readable instructions that, upon execution, initiate operations. Data processing system 1900 can include a processor 1902, a memory 1904, and a bus 1906 that couples various system components including memory 1904 to processor 1902.

Processor 1902 may be implemented as one or more processors. In an example, processor 1902 is implemented as a central processing unit (CPU). Processor 1902 may be implemented as one or more circuits capable of carrying out instructions contained in program code. The circuit may be an integrated circuit or embedded in an integrated circuit. Processor 1902 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1906 represents one or more of any of a variety of communication bus structures. By way of example, and not limitation, bus 1906 may be implemented as a Peripheral Component Interconnect Express (PCIe) bus. Data processing system 1900 typically includes a variety of computer system readable media. Such media may include computer-readable volatile and non-volatile media and computer-readable removable and non-removable media.

Memory 1904 can include computer-readable media in the form of volatile memory, such as random-access memory (RAM) 1908 and/or cache memory 1910. Data processing system 1900 also can include other removable/non-removable, volatile/non-volatile computer storage media. By way of example, storage system 1912 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1906 by one or more data media interfaces. Memory 1904 is an example of at least one computer program product.

Memory 1904 is capable of storing computer-readable program instructions that are executable by processor 1902. For example, the computer-readable program instructions can include an operating system, one or more application programs, other program code, and program data. Processor 1902, in executing the computer-readable program instructions, is capable of performing the various operations described herein that are attributable to a computer. It should be appreciated that data items used, generated, and/or operated upon by data processing system 1900 are functional data structures that impart functionality when employed by data processing system 1900. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1900 may include one or more Input/Output (I/O) interfaces 1918 communicatively linked to bus 1906. I/O interface(s) 1918 allow data processing system 1900 to communicate with one or more external devices and/or communicate over one or more networks such as a local area network (LAN), a wide area network (WAN), and/or a public network (e.g., the Internet). Examples of I/O interfaces 1918 may include, but are not limited to, network cards, modems, network adapters, hardware controllers, etc. Examples of external devices also may include devices that allow a user to interact with data processing system 1900 (e.g., a display, a keyboard, and/or a pointing device) and/or other devices such as accelerator card.

Data processing system 1900 is only one example implementation. Data processing system 1900 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

The example of FIG. 19 is not intended to suggest any limitation as to the scope of use or functionality of example implementations described herein. Data processing system 1900 is an example of computer hardware that is capable of performing the various operations described within this disclosure. In this regard, data processing system 1900 may include fewer components than shown or additional components not illustrated in FIG. 19 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Data processing system 1900 is an example of a computer that is capable of executing the software framework illustrated in the example of FIG. 2. Data processing system 1900 is also an example of a computer that may be communicatively linked to an IC or system as described herein with a DP array, where data processing system 1900 uses the IC/system as an accelerator. For example, processor 1902 may be a "host processor."

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one circuit capable of carrying out instructions contained in program code. The circuit may be an integrated circuit or embedded in an integrated circuit.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustrations, and combinations of blocks in the block diagrams and/or flowchart illustrations, may be implemented by special purpose hardware-based systems that perform the specified functions or acts or carry out combinations of special purpose hardware and computer instructions.

What is claimed is:

1. A method, comprising:
loading an application in a data processing array;
wherein the data processing array includes a plurality of compute tiles each having a processor;
wherein the application specifies kernels executable by the processors of the plurality of compute tiles and implements a plurality of stream channels that convey data to the plurality of compute tiles;
during runtime of the application, sequentially implementing a plurality of overlays in the data processing array, wherein each overlay implements a different mode of data movement in the data processing array via the stream channels; and
for each overlay implemented, performing a workload by moving data to the plurality of compute tiles based on the respective mode of data movement;
wherein the plurality of stream channels convey the data including feature maps and weights to the plurality of compute tiles executing the kernels, and wherein each overlay specifies a different allocation of the feature maps and the weights to the plurality of stream channels.

2. The method of claim 1, wherein the plurality of overlays are implemented in the data processing array for the application without loading a different application into the data processing array that loads different kernels into the compute tiles or modifies the stream channels.

3. The method of claim 1, wherein the data processing array is subdivided into a plurality of partitions each including a subset of the plurality of compute tiles, wherein each partition is adapted to concurrently implement a different application and sequentially implement different ones of the plurality of overlays specific to the application executed by the partition.

4. The method of claim 1, wherein the sequentially implementing the plurality of overlays comprises:
configurating the data processing array with a first overlay of the plurality of overlays to perform a first workload including a first matrix multiply operation; and
configurating the data processing array with a second overlay of the plurality of overlays to perform a second workload including a second matrix multiply operation;
wherein the first matrix multiply operation and the second matrix multiply operation are of different dimensions.

5. The method of claim 1, wherein the application implements a neural-network having a plurality of layers and each layer of the neural-network is mapped to one of the plurality of overlays, and wherein different ones of the plurality of overlays are loaded over time to implement a plurality of different functions performed by different ones of the plurality of layers of the neural-network.

6. The method of claim 1, wherein each overlay specifies a different mapping of buffers to stream channels.

7. The method of claim 1, wherein the sequentially implementing the plurality of overlays comprises:
loading an overlay of the plurality of overlays that enables at least one cascade connection that directly connects at least two processors of at least two compute tiles and loading another overlay of the plurality of overlays that disables the at least one cascade connection.

8. The method of claim 1, wherein the sequentially implementing the plurality of overlays comprises:
for each overlay, programming a plurality of direct memory access circuits with a different mapping of buffers to the stream channels.

9. The method of claim 1, further comprising:
for a selected overlay of the plurality of overlays, providing a runtime parameter to a selected compute tile of the plurality of compute tiles, wherein the runtime parameter configures an operational parameter of a kernel executed by the selected compute tile.

10. The method of claim 9, wherein the selected overlay corresponds to a particular layer of the application, and wherein the runtime parameter specifies at least one dimension of the particular layer implemented by the selected overlay.

11. The method of claim 9, wherein the runtime parameter selectively enables a function of the kernel executed by the selected compute tile.

12. The method of claim 1, further comprising:
for a selected overlay of the plurality of overlays, providing a runtime parameter to a selected compute tile of the plurality of compute tiles, wherein the runtime parameter selects a kernel from a plurality of kernels of the selected compute tile for execution.

13. A system, comprising:
a data processing array disposed in an integrated circuit, wherein the data processing array includes a plurality of compute tiles each having a processor; and
wherein the data processing array is configured to implement an application, wherein the application specifies kernels executable by the processors and a plurality of stream channels that convey data to the plurality of compute tiles; and
wherein, during runtime of the application, the data processing array is adapted to implement a plurality of overlays, wherein each overlay implements a different mode of data movement in the data processing array via the stream channels to perform a workload; and wherein the plurality of stream channels convey the data including feature maps and weights to the plurality of compute tiles executing the kernels, and wherein each overlay specifies a different allocation of the feature maps and the weights to the plurality of stream channels.

14. The system of claim 13, wherein the application implements a neural-network having a plurality of layers and each layer of the neural-network is mapped to one of the plurality of overlays, and wherein different ones of the plurality of overlays are loaded over time to implement a plurality of different functions performed by different ones of the plurality of layers of the neural-network.

15. The system of claim 13, wherein each overlay specifies a different mapping of buffers to stream channels.

16. The system of claim 13, wherein the data processing array is configured to implement the plurality of overlays by loading an overlay of the plurality of overlays that enables at least one cascade connection that directly connects at least two processors of at least two compute tiles and loading another overlay of the plurality of overlays that disables the at least one cascade connection.

17. The system of claim 13, wherein, for a selected overlay of the plurality of overlays, a runtime parameter provided to a selected compute tile of the plurality of compute tiles configures an operational parameter of a kernel executed by the selected compute tile.

18. The system of claim 17, wherein the selected overlay corresponds to a particular layer of the application, and wherein:
   the runtime parameter specifies at least one dimension of the particular layer implemented by the selected overlay; or
   the runtime parameter selectively enables a function of the kernel executed by the selected compute tile.

19. The system of claim 13, wherein the plurality of overlays are implemented in the data processing array for the application without loading a different application into the data processing array that loads different kernels into the compute tiles or modifies the stream channels.

20. The system of claim 13, wherein:
   a first overlay of the plurality of overlays configures the data processing array to perform a first workload including a first matrix multiply operation; and
   a second overlay of the plurality of overlays configures the data processing array to perform a second workload including a second matrix multiply operation;
   wherein the first matrix multiply operation and the second matrix multiply operation are of different dimensions.

\* \* \* \* \*